US011072976B2

(12) United States Patent
Anthony et al.

(10) Patent No.: US 11,072,976 B2
(45) Date of Patent: Jul. 27, 2021

(54) METHODS AND APPARATUS TO REDUCE NOISE IN MOTOR ASSEMBLIES

(71) Applicant: Hunter Douglas, Inc., Pearl River, NY (US)

(72) Inventors: James M. Anthony, Denver, CO (US); Daniel M. Fogarty, Boulder, CO (US); Paul A. Brayford, Denver, CO (US); Robert Fisher, II, Thornton, CO (US); Daniel A. Huber, Arvada, CO (US); Jan Pruegner, Dresden (DE); Clark Brace, Westminster, CO (US); Kevin Dann, Englewood, CO (US); Max Oelschlager, Boulder, CO (US); Todd Nelson, Louisville, CO (US); Nickolas C. Buccola, Jr., Brighton, CO (US); Michael Goldberg, Stanley, NC (US)

(73) Assignee: Hunter Douglas, Inc., Pearl River, NY (US)

(*) Notice: Subject to any disclaimer, the term of this patent is extended or adjusted under 35 U.S.C. 154(b) by 393 days.

(21) Appl. No.: 15/889,171

(22) Filed: Feb. 5, 2018

(65) Prior Publication Data
US 2018/0223595 A1 Aug. 9, 2018

Related U.S. Application Data

(60) Provisional application No. 62/455,366, filed on Feb. 6, 2017, provisional application No. 62/568,697, filed on Oct. 5, 2017.

(51) Int. Cl.
*E06B 9/56* (2006.01)
*E06B 9/42* (2006.01)
(Continued)

(52) U.S. Cl.
CPC .................. *E06B 9/56* (2013.01); *E06B 9/42* (2013.01); *F16D 3/12* (2013.01); *F16D 3/70* (2013.01);
(Continued)

(58) Field of Classification Search
CPC ..... E06B 9/72; E06B 9/70; E06B 9/42; E06B 9/174; E06B 9/50; E06B 2009/725;
(Continued)

(56) References Cited

U.S. PATENT DOCUMENTS 1,402,688 A * 1/1922 Travis ...................... F16D 3/78
464/95
1,668,140 A 5/1928 Buchheit
(Continued)

FOREIGN PATENT DOCUMENTS

DE 19736770 3/1999
DE 10201587 8/2003
(Continued)

OTHER PUBLICATIONS

European Patent Office, "Communication pursuant to Article 94(3) EPC", issued in connection with application No. 18155142.5 dated Mar. 10, 2020, 5 pages.
(Continued)

*Primary Examiner* — Johnnie A. Shablack
(74) *Attorney, Agent, or Firm* — Kilpatrick Townsend & Stockton LLP

(57) ABSTRACT

Example methods and apparatus can be used to reduce noise in motor assemblies, such as those used in architectural coverings. An example apparatus includes a first driver configured to be coupled to and rotated by an output shaft of a motor, a second driver, and a plurality of vibration-absorbers disposed between the first driver and the second driver. The second driver is configured to be coupled to a
(Continued)

rotating member to transfer rotational motion from the first driver to the rotating member via the vibration-absorbers.

20 Claims, 27 Drawing Sheets

(51) Int. Cl.
    *F16D 3/70*         (2006.01)
    *F16D 3/12*         (2006.01)
    *F16F 15/124*      (2006.01)
    *E06B 9/174*       (2006.01)

(52) U.S. Cl.
    CPC .... *F16F 15/124* (2013.01); *E06B 2009/1746* (2013.01); *F16F 2232/02* (2013.01); *F16F 2234/02* (2013.01)

(58) Field of Classification Search
    CPC ...... E06B 2009/1746; F16D 3/12; F16D 3/14; F16D 3/70
    See application file for complete search history.

(56) References Cited

U.S. PATENT DOCUMENTS

| | | | |
|---|---|---|---|
| 1,906,662 | A | 5/1933 | Sommerfeld, Jr. |
| 2,044,385 | A | 6/1936 | Geyer |
| 2,078,789 | A | 4/1937 | Bergman |
| 2,354,832 | A | 8/1944 | Ristine |
| 2,392,307 | A | 1/1946 | Blasco |
| 2,870,918 | A | 1/1959 | Grubbs |
| 2,930,211 | A * | 3/1960 | Guy .................... F16D 3/78 464/93 |
| 3,115,927 | A | 12/1963 | Znamirowski |
| 3,274,676 | A | 9/1966 | Gallagher et al. |
| 3,310,099 | A | 3/1967 | Hunter et al. |
| 3,422,637 | A * | 1/1969 | Kelley .................... F16D 3/78 464/93 |
| 3,724,239 | A * | 4/1973 | Calistrat .................. F16D 3/78 464/92 |
| 4,159,162 | A | 6/1979 | Christoffel |
| 4,615,371 | A | 10/1986 | Clauss |
| 4,623,812 | A | 11/1986 | van de Griend |
| 4,827,199 | A | 5/1989 | Kaucic et al. |
| 4,885,948 | A | 12/1989 | Thrasher, Jr. et al. |
| 5,671,387 | A | 9/1997 | Jacobs et al. |
| 5,793,174 | A | 8/1998 | Kovach et al. |
| 5,883,480 | A | 3/1999 | Domel et al. |
| 5,921,866 | A * | 7/1999 | Weiss .................... F16D 3/70 464/85 |
| 5,990,646 | A | 11/1999 | Kovach et al. |
| 6,057,658 | A | 5/2000 | Kovach et al. |
| 6,181,089 | B1 | 1/2001 | Kovach et al. |
| 6,186,211 | B1 | 2/2001 | Knowles |
| 6,259,218 | B1 | 7/2001 | Kovach et al. |
| 6,283,427 | B1 | 9/2001 | Moller et al. |
| 6,325,722 | B1 * | 12/2001 | Ciotola .................. F16D 3/70 464/85 |
| 6,328,274 | B1 | 12/2001 | Hayashi |
| 6,369,530 | B2 | 4/2002 | Kovach et al. |
| 6,388,404 | B1 | 5/2002 | Schnebly et al. |
| 6,497,267 | B1 | 12/2002 | Azar et al. |
| 6,561,255 | B1 | 5/2003 | Mullet |
| 6,628,029 | B2 | 9/2003 | Astegno |
| 6,794,778 | B1 | 9/2004 | Walker et al. |
| 6,979,962 | B2 | 12/2005 | Cavarec et al. |
| 7,002,310 | B2 | 2/2006 | Cavarec et al. |
| 7,235,014 | B2 * | 6/2007 | Gilbert .................. F16D 3/48 464/138 |
| 7,549,615 | B2 | 6/2009 | Shevick |
| 7,707,703 | B2 * | 5/2010 | Gilbert .................. F16D 3/48 29/434 |
| 7,823,620 | B2 | 11/2010 | Kirby |
| 7,837,565 | B2 * | 11/2010 | Durre .................... F16D 3/78 464/93 |
| 8,016,016 | B2 | 9/2011 | Berman et al. |
| 8,141,614 | B2 | 3/2012 | Friedrick et al. |
| 8,299,734 | B2 | 10/2012 | Mullet et al. |
| 8,307,878 | B2 | 11/2012 | Faller et al. |
| 8,368,328 | B2 | 2/2013 | Mullet et al. |
| 8,371,358 | B1 | 2/2013 | Mullet et al. |
| 8,464,776 | B2 | 6/2013 | Anthoine |
| 8,575,872 | B2 | 11/2013 | Mullet et al. |
| 8,596,594 | B2 | 12/2013 | Shevick |
| 8,659,246 | B2 | 2/2014 | Mullet et al. |
| 8,723,454 | B2 | 5/2014 | Skinner et al. |
| 8,791,658 | B2 | 7/2014 | Mullet et al. |
| 8,807,196 | B2 | 8/2014 | Mullet et al. |
| 8,944,138 | B2 | 2/2015 | Feldstein et al. |
| 8,947,027 | B2 | 2/2015 | Mullet et al. |
| 9,018,868 | B2 | 4/2015 | Lucas et al. |
| 9,152,032 | B2 | 10/2015 | Mullet et al. |
| 9,194,179 | B2 | 11/2015 | Mullet et al. |
| 9,249,623 | B2 | 2/2016 | Mullet et al. |
| 9,334,688 | B2 | 5/2016 | Colson et al. |
| 9,376,862 | B2 | 6/2016 | Mullet et al. |
| 9,376,863 | B2 | 6/2016 | Mullet et al. |
| 9,394,743 | B2 | 7/2016 | Mullet et al. |
| 9,410,369 | B2 | 8/2016 | Mullet et al. |
| 9,410,371 | B2 | 8/2016 | Faller et al. |
| 9,489,834 | B2 | 11/2016 | Hall et al. |
| 9,540,871 | B2 * | 1/2017 | Hall .................... F24S 50/40 |
| 9,611,690 | B2 | 4/2017 | Mullet et al. |
| 9,725,948 | B2 | 8/2017 | Mullet et al. |
| 9,725,952 | B2 | 8/2017 | Mullet et al. |
| 9,745,797 | B2 | 8/2017 | Mullet et al. |
| 9,771,755 | B2 | 9/2017 | Mullet et al. |
| 9,890,585 | B2 | 2/2018 | Mullet et al. |
| 9,896,882 | B2 | 2/2018 | Mullet et al. |
| 9,926,741 | B2 * | 3/2018 | Faller .................... E06B 9/322 |
| 9,976,332 | B2 * | 5/2018 | Scheuring ................ F16D 3/12 |
| 9,982,673 | B2 * | 5/2018 | Ouwenga ................ F02B 33/34 |
| 10,233,975 | B2 * | 3/2019 | Pratley .................... F02B 33/38 |
| 10,246,938 | B2 | 4/2019 | Mullet et al. |
| 10,415,647 | B2 * | 9/2019 | Pratley .................... F02B 39/12 |
| D866,603 | S * | 11/2019 | Pratley .................... F24S 50/40 D15/5 |
| 2003/0015301 | A1 | 1/2003 | Killo et al. |
| 2005/0225269 | A1 | 10/2005 | Barak |
| 2006/0086874 | A1 | 4/2006 | Habel et al. |
| 2006/0232233 | A1 | 10/2006 | Adams et al. |
| 2007/0193015 | A1 * | 8/2007 | Gilbert .................... F16D 3/48 29/428 |
| 2009/0199975 | A1 | 8/2009 | Yeh |
| 2009/0308543 | A1 | 12/2009 | Kates |
| 2010/0269988 | A1 | 10/2010 | Mullet et al. |
| 2010/0307701 | A1 | 12/2010 | Peterson |
| 2011/0308748 | A1 | 12/2011 | Brignatz et al. |
| 2013/0112797 | A1 | 5/2013 | Newman, Jr. |
| 2013/0180666 | A1 | 7/2013 | Mullet et al. |
| 2014/0084122 | A1 | 3/2014 | Shevick |
| 2014/0206460 | A1 * | 7/2014 | Dupielet .................. E06B 9/68 464/111 |
| 2014/0277749 | A1 | 9/2014 | Choo et al. |
| 2015/0000849 | A1 | 1/2015 | Barnes et al. |
| 2015/0075732 | A1 | 3/2015 | Kirby et al. |
| 2015/0101766 | A1 | 4/2015 | Feldstein et al. |
| 2015/0159433 | A1 | 6/2015 | Adams et al. |
| 2015/0284992 | A1 | 10/2015 | Hall et al. |
| 2015/0284998 | A1 | 10/2015 | Hall et al. |
| 2015/0364969 | A1 | 12/2015 | Brondex |
| 2016/0123077 | A1 | 5/2016 | Lueker |
| 2016/0124418 | A1 | 5/2016 | Lagarde et al. |
| 2016/0143470 | A1 | 5/2016 | Mullet et al. |
| 2016/0340977 | A1 | 11/2016 | Faller et al. |
| 2016/0356318 | A1 * | 12/2016 | Pratley .................... F16D 3/70 |
| 2018/0223595 | A1 * | 8/2018 | Anthony .................. F16D 3/70 |
| 2018/0259033 | A1 * | 9/2018 | Basutto .................. E06B 9/582 |
| 2018/0347661 | A1 * | 12/2018 | Pratley .................... F02B 39/04 |

FOREIGN PATENT DOCUMENTS

| | | |
|---|---|---|
| DE | 202007010766 | 11/2007 |
| EP | 1288430 | 3/2003 |

(56) References Cited

FOREIGN PATENT DOCUMENTS

| | | |
|---|---|---|
| EP | 2177706 | 4/2010 |
| EP | 2208849 | 7/2010 |
| EP | 2246517 | 11/2010 |
| FR | 1225869 | 7/1960 |
| FR | 1486346 | 6/1967 |
| FR | 2875258 | 3/2006 |
| WO | 2010011751 | 1/2010 |
| WO | 2011000908 | 1/2011 |
| WO | 2011106397 | 9/2011 |
| WO | 2011106398 | 9/2011 |
| WO | 2013059037 | 4/2013 |
| WO | 2014062504 | 4/2014 |
| WO | 2014169173 | 10/2014 |

OTHER PUBLICATIONS

European Patent Office, "Extended Search Report" issued in connection with EP Patent Application No. 18155142.5, dated May 30, 2018, 10 pages.

\* cited by examiner

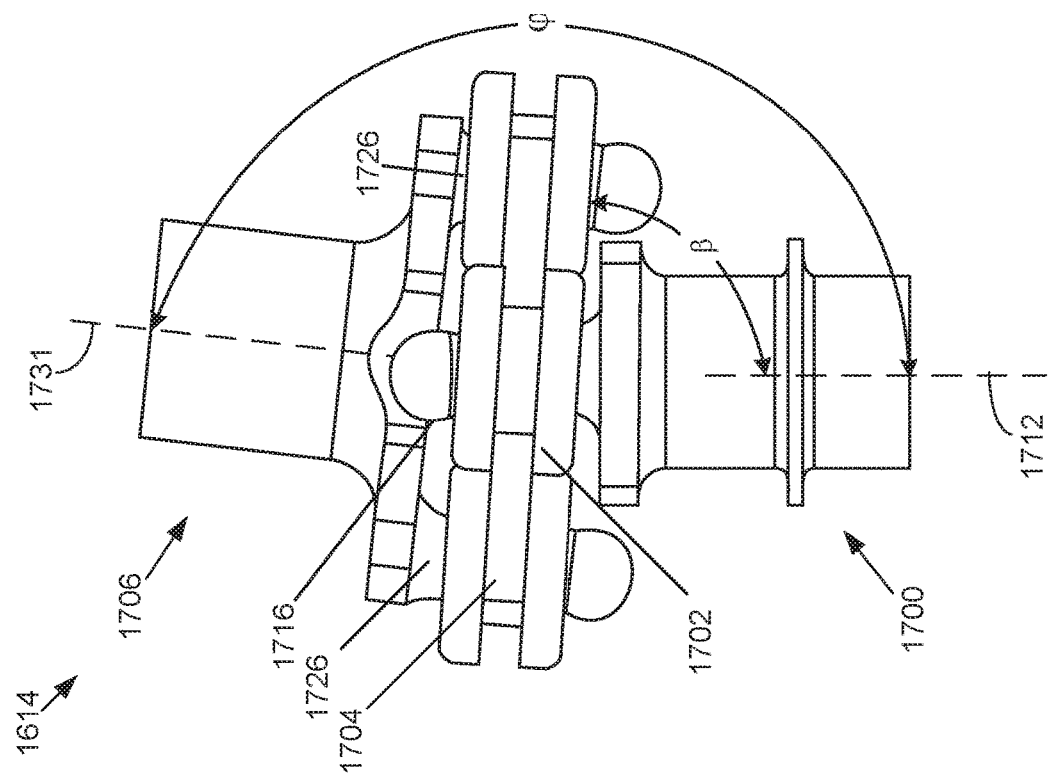
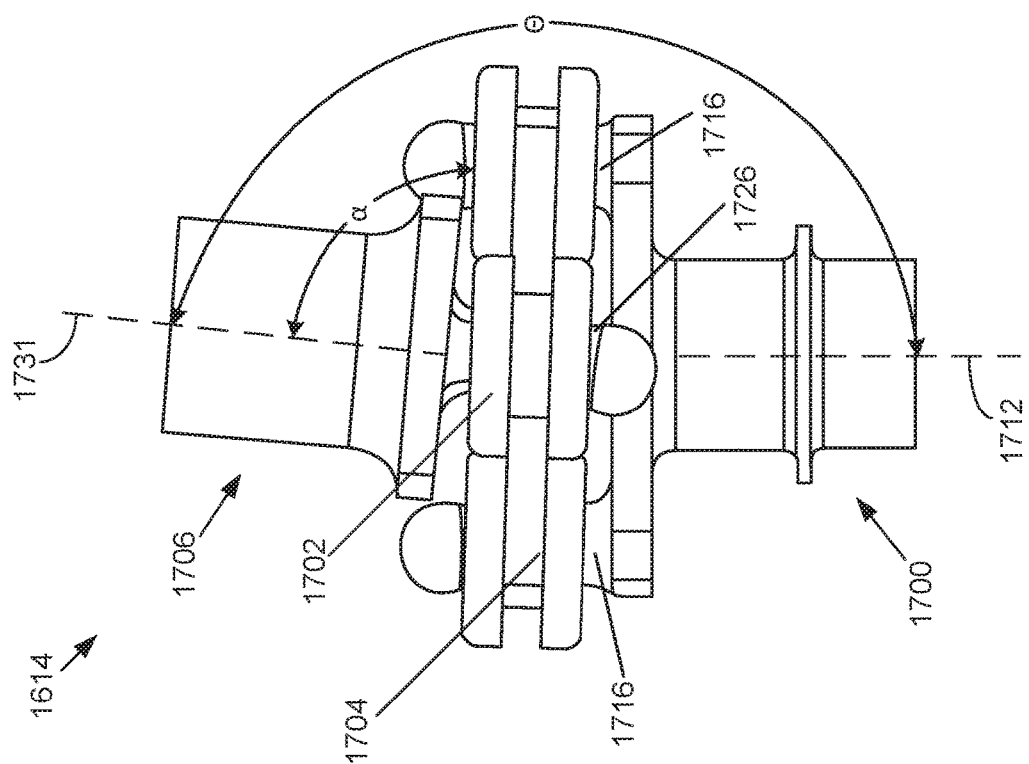
FIG. 21B
FIG. 21A

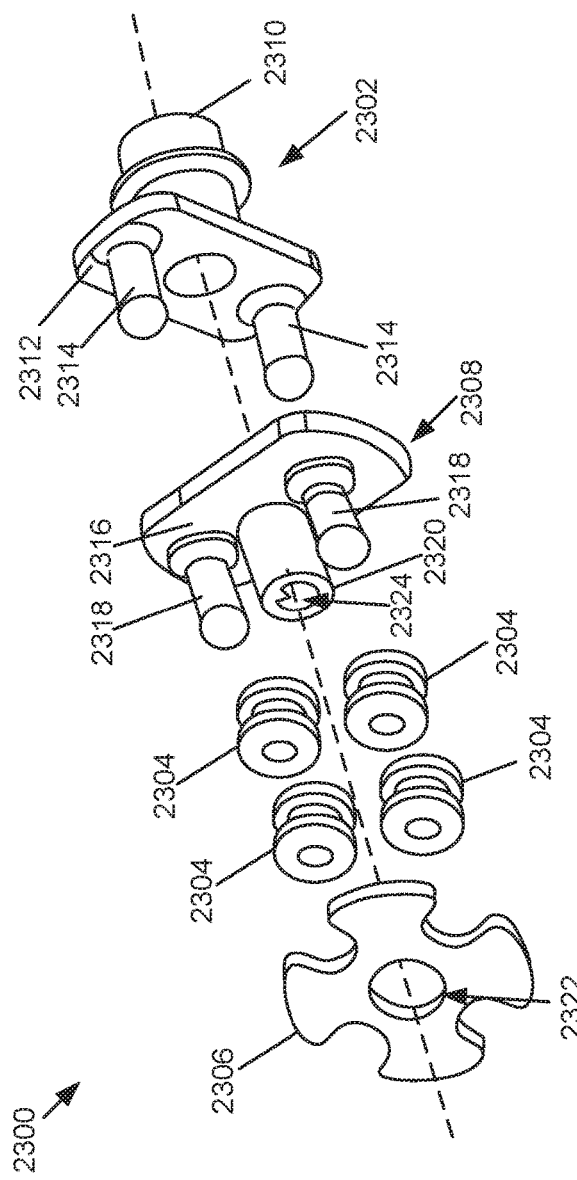
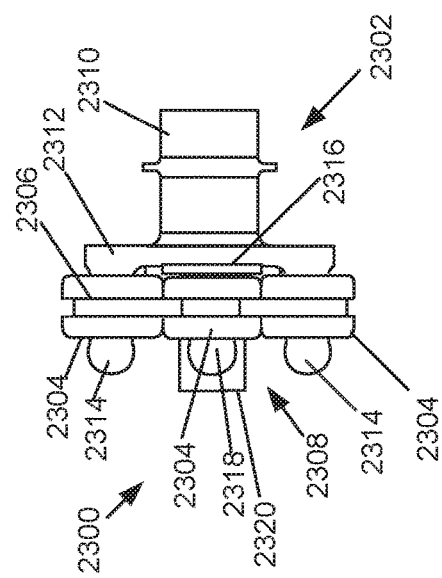
FIG. 23A
FIG. 23B

METHODS AND APPARATUS TO REDUCE NOISE IN MOTOR ASSEMBLIES

RELATED APPLICATIONS

This patent claims the benefit under 35 U.S.C. § 119(e) to U.S. Provisional Application No. 62/455,366, titled "METHODS AND APPARATUS TO REDUCE NOISE IN ARCHITECTURAL COVERINGS," filed Feb. 6, 2017, and to U.S. Provisional Application No. 62/568,697, titled "METHODS AND APPARATUS TO REDUCE NOISE IN ARCHITECTURAL COVERINGS," filed Oct. 5, 2017, both of which are incorporated herein by this reference in their entireties.

FIELD OF THE DISCLOSURE

This disclosure relates generally to motors and, more particularly, to methods and apparatus to reduce noise in motor assemblies.

BACKGROUND

Motor assemblies are used in many applications to provide power to a downstream or driven member. Motor assemblies include a motor with an output shaft that is operatively coupled to the driven member. The connection between the motor output shaft and the driven member often generates significant noise due to vibrations between the components.

For instance, architectural coverings such as roller blinds, vertical window coverings, horizontal window coverings, and spring-loaded window coverings provide shading and privacy. Such architectural coverings often include a motorized assembly coupled with a covering fabric or other shading material. In particular, a motor rotates a roller tube or lift rod to raise or lower the cover or shading material. These motorized assemblies often include complex coupling devices with many parts or components that connect an output shaft of the motor to the roller tube or lift rod. As a result, these motorized assemblies tend to be loud and noisy when operating due to vibration of the parts and components, which is a nuisance to the user and/or others in the area.

BRIEF DESCRIPTION OF THE DRAWINGS

Implementations of motor assemblies constructed in accordance with principles of inventions disclosed herein will be described with reference to the following drawings, which are not to be considered as limiting, but rather, illustrations of examples of manners of implementing principles of the disclosure. For example, while implementations of motor assemblies within architectural coverings are described, many other implementations will occur to persons of ordinary skill in the art upon reading this disclosure.

FIG. 21A is a side view of the example of the drive coupling of FIG. 16 in which a second driver of the drive coupling is tilted about an axis and is unaligned with respect to a first driver of the drive coupling.

FIG. 21B is a side view of the example of the drive coupling of FIG. 21A in which the second driver is tilted about another axis and is unaligned with respect to the first driver.

FIG. 23A is an exploded view of another example of a drive coupling that may be used with an architectural covering.

FIG. 23B is a side view of the example of the drive coupling of FIG. 23A in an assembled state.

DETAILED DESCRIPTION

Figure 1:
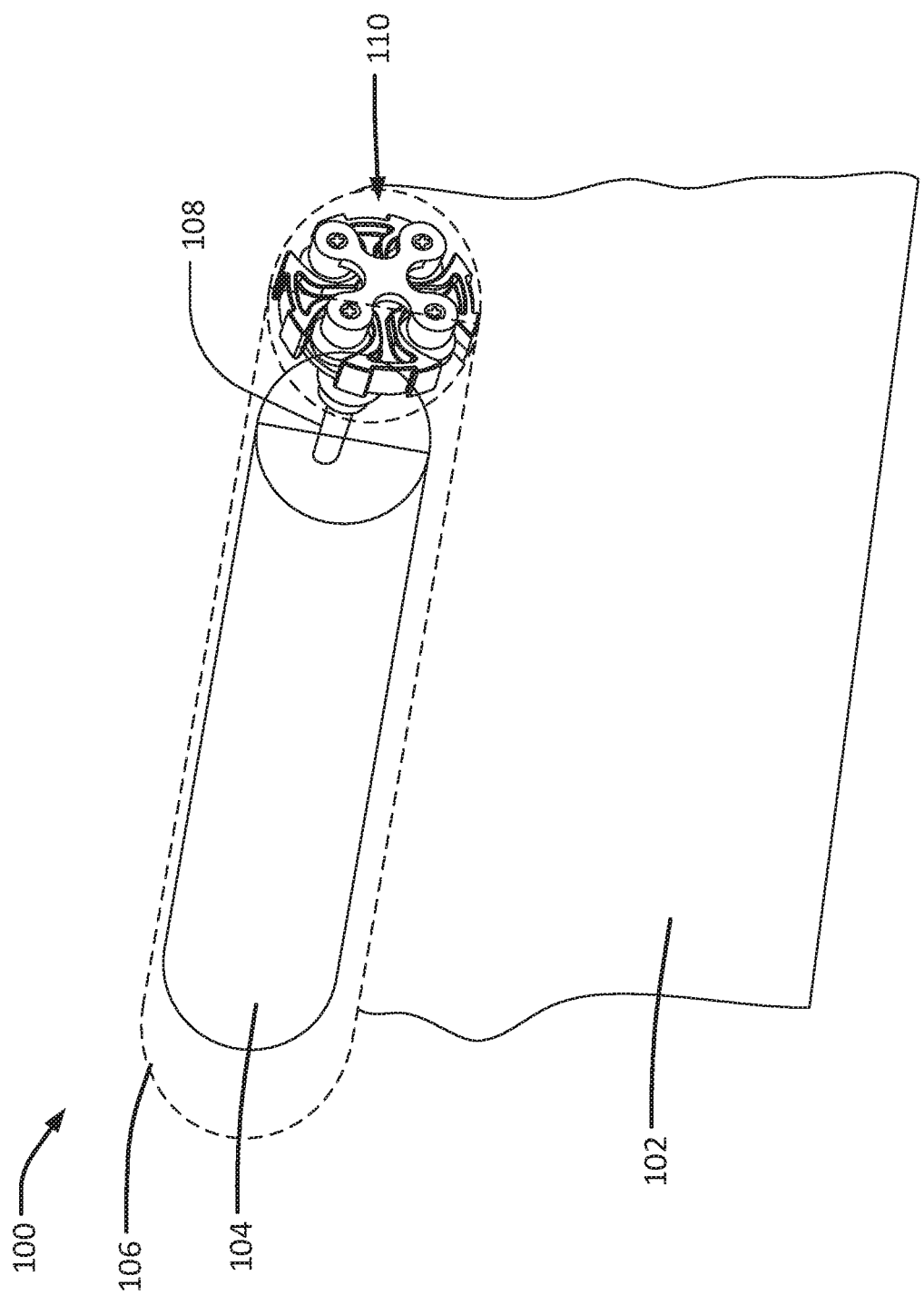
FIG. 1 is a perspective view of an example of an architectural covering employing an example of a drive coupling constructed in accordance with one or more principles of this disclosure.

Disclosed herein are example drive couplings used to reduce potential noise generated by a connection between a driving member, such as an output shaft of a motor of a motor assembly, and a downstream or driven member. While some of the example drive couplings and other related aspects disclosed herein are described in connection with motor assemblies in architectural coverings, any of the examples disclosed herein can likewise be implemented with motor assemblies in other types of devices or systems, such as material handling systems, robotics, belt or chain drive systems, and/or any other type of motor assembly having a connection between an output shaft (a driving member) and a downstream driven member. The example drive couplings and/or other aspects disclosed herein can be used with these motor assemblies to similarly reduce vibration (and, thus, potential noise) between a motor and/or driving member and a downstream driven member. Thus, the example drive couplings and/or others aspects are not limited to architectural coverings.

Some architectural coverings include a motor assembly to extend or retract a covering (e.g., by rotating a roller tube) to cover or uncover an architectural opening and/or structure. For example, in a vertically extending covering, a motor operates in one direction to raise the covering and in the opposite direction to the lower the covering. The motor is coupled to a rotating member, such as a roller tube or a lift rod. When rotated, the covering or a cord operating the covering may be wound or unwound by the rotating member to raise or lower the corresponding covering. Known architectural coverings, including motorized coverings, non-motorized coverings, and/or dual operation coverings, typically generate a significant amount of audible noise, which can become a nuisance to those in the surrounding area of the architectural covering.

Disclosed herein are example methods and apparatus that reduce potential noise generated by architectural coverings. Aspects of this disclosure may be implemented to reduce potential noise from any type of motorized, non-motorized, and/or dual operation architectural covering. Thus, aspects of this disclosure result in quieter, more desirable architectural coverings. While humans are capable of hearing frequencies of between 20 hertz (Hz)-20 kilo-Hz (kHz) (which are considered audible frequencies), certain frequencies have a greater perceived loudness to humans. For instance, frequencies of between 1 kHz and 5 kHz are generally perceived as louder than other audible frequencies, even if the amplitude or strength of the noise is in this range is less than the amplitude or strength of the noise in a frequency outside this range. Example aspects disclosed herein result in reduced noise (e.g., from 37 decibels (db) to 32 db) in this range of frequencies (as well as other frequencies outside the range) and, thus, create a more desirable environment for a user. Aspects of this disclosure may also reduce the number of parts and components in an architectural covering, which decreases manufacturing costs, decreases assembly time, and increases the useful life of the architectural covering (e.g., by decreasing the number of parts and components that would otherwise be subject to wear and, thus, failure over time).

In accordance with one aspect of the disclosure, an architectural covering includes a drive coupling that transfers rotational motion from an output shaft of a motor to a rotating member (e.g., a roller tube, a lift rod, etc.), arranged and configured to raise or lower a covering. Some such drive couplings include one or more vibration-absorbers (which may be referred to isolators), such as sound-dampening elastic rings, which reduce potential noise generated by vibration between the parts of the architectural covering. Some such drive couplings also employ significantly fewer parts or components than known architectural coverings and, thus, further reduce vibrations between the parts and components. By using few parts or components, the example drive couplings are also less expensive to manufacture and result in reduced assembly time. The example drive couplings disclosed herein may be used with any type of architectural covering such as conventional draperies, shutters, horizontal and vertical blinds, and various other kinds of shades, including roller and cellular shades, etc.

In accordance with some aspects of this disclosure, the drive coupling includes a driver configured to be coupled to and rotated by an output shaft of a motor. Such a driver, which may be referred to as an input driver, interfaces with a driven member, which may be referred to as an output driver, that is coupled to a rotating member (e.g., a roller tube, a lift rod, etc.) for extending or retracting an architectural covering. As such, the input driver rotates the driven member to rotate the corresponding rotating member to extend or retract the covering.

In accordance with one aspect of the disclosure, the driven member is implemented as an adapter, such as a tube adapter, that has one or more features to engage matching feature(s) on a rotating member, such as a roller tube. For example, the motor and drive coupling may be disposed within the roller tube, and the tube adapter may engage an inside surface of the roller tube. The tube adapter rotates with the motor output shaft. Thus, the tube adapter transfers rotational motion of the motor output shaft to the rotating member to extend or retract the corresponding covering.

As mentioned above, in one aspect of the disclosure, the drive coupling includes an input driver to be coupled to the output shaft of the motor. The input driver interfaces with the tube adapter (e.g., the driven member) to rotate the tube adapter when the motor output shaft is rotated. In other words, the input driver operates to rotate the tube adapter and, thus, rotate the roller tube. In one aspect of the disclosure, one or more vibration-absorbers are disposed between a vibration generator, such as the motor and/or the input driver (which is coupled to the output shaft of the motor), and a driven member, such as the tube adapter. The vibration-absorber(s) may be constructed of a lower durometer material, such as a material that absorbs vibrations between the parts of the drive coupling and, thus, reduces potential noise that would otherwise be caused thereby. In some examples, this is accomplished due to the shape of the vibration-absorber(s), which may have relatively thin wall sections (e.g., about 0.032 inches (0.8128 millimeters (mm)) disposed in compression during use, which allows for isolating vibration while minimizing backlash (even with lower durometer material (e.g., 50 Shore A)). In other words, because the durometer is low, vibration damping is optimized while the amount of material that allows compression is minimized. Known spider couplings interpose a rigid, high durometer spider (55 Shore D) between a driving jaw coupling and a driven jaw coupling to allow for misalignment (e.g., slop or play) between the two jaw couplings. However, unlike these known spider couplings, the example drive couplings disclosed herein interpose one or more vibration-absorber(s), such as a vibration-absorber of a lower durometer material (e.g., 50 Shore A), between a vibration generator, such as the motor and/or the input driver, and the one or more downstream/driven member(s), such as the second driver, the tube adapter, the roller tube, the headrail, another drive shaft, etc., to reduce vibrations between the part(s). In other words, the vibration-absorber(s) isolate(s) the vibration generator from the downstream/driven member(s) that would otherwise amplify and/or increase the vibrations and noise. In one aspect of the disclosure, the vibration-absorber(s) (of relatively softer material) create a relatively tight interface between the vibration generator and the downstream/driven member(s) that reduces vibrations and, thus, reduces noise that would otherwise be caused between these parts and/or other downstream/driven member(s). Further, in some instances, the vibration-absorbers provide intimate contact between the driving member, such as the driver, and the driven member, such as the rotating member, to minimize backlash, which may otherwise be caused by a covering that disposes the weight alternately from one side to the other side of the rotating member.

In accordance with one aspect of the disclosure, the one or more vibration-absorber(s) are coupled to a portion of the driver. Further, the driven member is operatively engaged with the one or more vibration-absorber(s). As used herein, the terms "operatively engaged," "operatively engages," "operatively engaging," or variations thereof mean a first part is in direct and/or indirect contact with a second part (e.g., indirect contact via one or more intermediary parts). As such, when the driver is rotated, rotational motion is transferred to the driven member (and, thus, the rotating member) via the vibration-absorber(s).

In accordance with one aspect of the disclosure, the driver has a set of mounts to which a driven member, such as tube adapter, may be mounted. In one aspect of the disclosure, the mounts are posts that extend parallel to and spaced apart from a rotational axis of the driver. As the driver rotates, the posts rotate about the rotational axis. In accordance with one aspect of the disclosure, the tube adapter includes a central portion with one or more arms (e.g., having features to engage the rotating member) extending outwardly from the central portion. The central portion is disposed between the posts of the driver and the arms extend outwardly, beyond the posts to engage the roller tube. Thus, the output shaft of the motor rotates the driver, which rotates the tube adapter and, thus, rotates the roller tube.

In accordance with one aspect of the disclosure, to reduce vibration between the driver and the tube adapter, the drive coupling includes one or more vibrations-absorbers interposed between the driver and the tube adapter. In one aspect of the disclosure, a set of vibration-absorbers, hereinafter "elastic rings" for the sake of convenience without intent to limit, are coupled to portions of the driver and interposed between the driver and the tube adapter. For example, the drive coupling may include elastic rings (e.g., non-viscoelastic rings), such as grommets, mounted on the posts. In particular, one elastic ring is disposed on each of the posts. The elastic rings are engaged with and may be constructed to carry the tube adapter. Thus, the elastic rings isolate the tube adapter from the driver. In accordance with one aspect of the disclosure, the tube adapter includes a web or rib between each pair of adjacent arms. The elastic rings may be disposed between the adjacent arms with the web or rib disposed in the groove of the respective elastic ring. The interface between the webs and the elastic ring and/or between the elastic ring and the posts result in less noise generated by the parts of the architectural covering. In accordance with one aspect of the disclosure, the elastic rings are constructed of nitrile rubber (otherwise known as Buna-N).

In accordance with another aspect of this disclosure, the drive coupling includes a driver, implemented as a first driver (e.g., the input driver) that is coupled to the output shaft of the motor, which is connected to a driven member, implemented as a similarly shaped second driver (e.g., the driven member, the output driver, etc.) that is coupled to a rotating member, such as a lift rod, a drive shaft, etc. The first driver may be connected to the second driver via one or more posts and vibration-absorber(s) (e.g., as described above) using an intermediate generally clover-shaped disc or hub to transfer torque, while isolating vibration between the driver and the driven member. In other words, when the motor output shaft is rotated, the first driver interfaces with the hub via the one or more vibration-absorber(s), which interfaces with the second driver via one or more vibration-absorber(s) to rotate the rotating member, such as a driven shaft or lift rod. In one aspect of this disclosure, one or more spools with lift cords are coupled to the lift rod. The lift rod may be rotated to wind or unwind the lift cord(s) to extend or retract the corresponding cover in a manner known in the art or to be developed.

Similar to the drive coupling disclosed above, one or more vibration-absorbers may be disposed between the first driver and the second driver (e.g., the driven member) to reduce potential noise that could otherwise result from operation of the parts connecting the motor and any downstream/driven parts. The vibration-absorber(s) isolate the vibration source, such as the motor and/or the first driver, from the downstream/driven member(s), such as the second driver, the lift rod, the headrail, etc. that could otherwise amplify and/or increase the vibrations and noise. Similar to the vibration-absorbers disclosed above, the vibration-absorber(s) may be constructed of relatively soft material that creates a tight interface between the vibration generator and the downstream/driven member(s), which reduces movement between these parts. Further, the vibration-absorbers may compress or deform to absorb movement or vibration between the parts. Thus, the vibration-absorbers reduce potential vibrations (and, thus, reduce noise) that would otherwise be caused between these parts and/or other downstream/driven member(s) using a looser connection and more rigid parts.

In accordance with one aspect of the disclosure, the first driver has a first set of mounts and the second driver has a second set of mounts. In one aspect of the disclosure, the mounts are posts. For example, the first driver may have a first set of posts that extend outward toward the second driver, and the second driver may have a second set of posts that extend outward toward the first driver. In one aspect of the disclosure, the drive coupling includes a hub disposed between the first set of posts and the second set of posts. The output shaft of the motor rotates the first driver, which rotates the hub, which rotates the second driver and, thus, rotates the rotating member.

In accordance with one aspect of the disclosure, to reduce vibration between the first driver, the hub and the second driver, the drive coupling includes one or more vibration-absorbers interposed between the first driver and the hub, and between the hub and the second driver. Similar to the vibration-absorbers disclosed above, the vibration-absorbers may be implemented as elastic rings, such as grommets. In one aspect of the disclosure, one elastic ring is disposed on each of the first set of posts and the second set of posts. Thus, the elastic rings separate the first driver from the hub and separate the second driver from the hub. In accordance with one aspect of the disclosure, the hub includes a plurality of notches and the elastic rings are disposed in the notches such that an outer edge of the hub extends into grooves in the outer edges of the elastic rings. The interface between the posts, the elastic rings and the hub results in less noise generated by the parts of the architectural covering. In accordance with one aspect of the disclosure, the elastic rings are constructed of nitrile rubber (otherwise known as Buna-N).

In some instances, the output shaft of the motor and the rotating member may be misaligned. For example, due to tolerances in manufacturing of the mounts that hold the motor and/or the rotating member, the axis of the motor output shaft and the axis of the rotating member may not be perfectly aligned. In known coupling assemblies, this misalignment causes increased wear and, thus, degradation of the parts of the coupling assembly. In accordance with one aspect of the disclosure, the second driver may be tiltable with respect to the rotational axis of the first driver, which enables the drive coupling to transfer rotational motion even when the motor output shaft and the axis of the rotating member are not aligned. The vibration-absorbers compress or deform, which allows the posts of the first driver and/or the second driver to be tilted with respect to the hub and, thus, to the other of the first driver and/or the second driver. As such, the rotational axis of the second driver (and, thus, the rotating member) can be misaligned with the rotational axis of the first driver and the output shaft of the motor while still being rotatably coupled to the first driver. This advantageously enables the drive coupling to transfer rotational motion even when the output shaft of the motor and the rotating member (e.g., the lift rod) are not axially aligned and without causing addition wear on the parts of the drive coupling.

Also disclosed herein are examples of valances having sound-dampening material for attenuating potential noise generated by architectural coverings. As used herein, the term "valance" means structure that is to be disposed in front of and/or over an architectural covering to hide and/or otherwise block the view of at least a portion of the architectural covering. Some valances are decorative and have aesthetic features. For example, a valance may be disposed outside a window frame to hide an architectural covering located in the window frame. The valance may be coupled to the architectural covering and/or to the architectural structure (e.g., the window frame). In accordance with one aspect of the disclosure, a layer or strip of sound-dampening material is coupled to a back side of the valance facing the architectural covering. In accordance with one aspect of the disclosure, the sound-dampening material is butyl rubber. The sound-dampening material attenuates or dampens sound generated by the architectural covering. As a result, example valances greatly reduce potential noise generated by architectural coverings (e.g., motorized coverings).

In accordance with one aspect of the disclosure, a valance is part of a headrail that is used to mount the architectural covering to an architectural structure (e.g., a window frame). For example, a headrail may include a top mounting plate and a valance extending downward from the top mounting plate. The top mounting plate may be coupled (e.g., via one or more screws) to the architectural structure to mount the headrail (and, thus, the architectural covering) to the architectural structure. The valance extends downwardly from the top mounting plate to cover and/or otherwise obstruct the view of the architectural covering. In accordance with other aspects of the disclosure, the valance may be separate from the top mounting plate and separately coupled to the outside of the architectural covering and/or to the architectural structure.

Also disclosed herein are examples of techniques to couple the layer of sound-dampening material to the back side of the valance. In accordance with one aspect of the disclosure, a clip is used to couple the layer of sound-dampening material to the back side of the valance. For example, the sound-dampening material may be coupled to a back side of the clip (e.g., via an adhesive). In one aspect of the disclosure, the back side of the valance includes a first connector (e.g., a female connector) and the back side of the clip has a second connector (e.g., a male connector) to mate with the first connector. The clip may be mounted to the back side of the valance (via the connectors), thereby holding the sound-dampening material between the clip and the valance and, thus, coupling the sound-dampening material to the back side of the valance. In some instances, using the clip prevents contact between the covering and the strip of sound-dampening material (which may otherwise leave marks or coloring on the covering material). Additionally or alternatively, the layer of sound-dampening material may include an adhesive side, which may be contacted against the back side of the valance.

Also disclosed herein are example methods of manufacturing a valance and the example valances resulting from such methods. In accordance with one aspect of the disclosure, the clip and the layer of sound-dampening material are constructed by extruding the clip and the sound-dampening material simultaneously. As such, the layer of sound-dampening material is coupled (e.g., bonded) to the back side of the clip. In accordance with one aspect of the disclosure, the valance is also manufactured via an extrusion process. Then, the clip may be coupled to the back side of the valance to couple the sound-dampening material to the back side of the valance. In accordance with another aspect of the disclosure, a layer of sound-dampening material may be co-extruded onto a back side of a valance. In some instances, the valance includes a pocket or recess, and the layer of sound-dampening material is extruded into the recess. In accordance with other aspects of the disclosure, other types of manufacturing processes may be implemented.

In some aspects of this disclosure, a drive coupling as disclosed herein may be implemented in an architectural covering also having a valance with sound-dampening material as disclosed herein. In some instances, the combination of these features produces improved noise reduction compared to each feature used by itself. In accordance with some aspects of this disclosure, the combination of features may also be implemented with one or more other noise-reduction features. In accordance with other aspects of this disclosure, the example drive couplings and the example valances with sound-dampening material may be used separately from one another and/or in combination with other noise-reduction features.

All apparatuses and methods discussed in this document and illustrated in the accompanying drawings are examples of apparatuses and/or methods implemented in accordance with one or more principles of this disclosure, which principles may be applied singly or in combination. These examples are not the only way to implement these principles but are merely examples. Other examples of manners of implementing the disclosed principles will occur to a person of ordinary skill in the art upon reading this disclosure. It will be appreciated that the drawings illustrate examples of embodiments of the disclosure incorporating one or more principles or features, and thus reference to or description of a particular structure or element in the figures is to be understood as reference to or description of an example of an embodiment, but not necessarily the only manner of embodying the disclosure.

Turning now to the figures, FIG. 1 illustrates an example of an architectural covering 100 having a covering 102. Architectural covering 100 may be used to cover an architectural structure, such as a wall, and/or an architectural opening, such as a window, a door, a sky light, an archway, etc. In accordance with one aspect of this disclosure, an example drive coupling may be coupled to the output shaft of the motor to transfer rotational motion to the roller tube or other rotating member that moves a covering in one direction or the other. Example drive couplings disclosed herein greatly reduce potential noise that would otherwise be generated by the connection between the motor and the rotating member.

For example, in the illustrated example of FIG. 1, architectural covering 100 includes a motor 104 and a rotating member, implemented as a roller tube 106 (shown in dashed lines). Covering 102 is wound around or unwound from roller tube 106 to extend or retract covering 102. In other words, motor 104 operates to rotate roller tube 106 in one direction to retract covering 102 (e.g., raise covering 102 or otherwise uncover an architectural structure and/or opening) and rotate roller tube 106 in the opposite direction to extend the corresponding covering 102 (e.g., lower covering 102 or otherwise cover the architectural structure and/or opening). Motor 104 may be powered by any combination of internal and/or external power line connections, power from a wall outlet, battery(ies), fuel cells, solar panels, wind powered generators, and/or any other power source. Motor 104 has a motor output shaft 108.

To transfer rotational motion from motor output shaft 108 to roller tube 106, example architectural covering 100 includes an example drive coupling 110. Drive coupling 110 is coupled to and rotates with motor output shaft 108. Additionally, drive coupling 110 is coupled to roller tube 106. As such, when motor 104 rotates motor output shaft 108, drive coupling 110 transfers the rotational motion to roller tube 106.

In the illustrated example of FIG. 1, roller tube 106 is disposed outside and concentric with motor 104. In other words, motor 104 is disposed within roller tube 106 and operates to rotate roller tube 106 from within roller tube 106. In other aspects of this disclosure, motor 104 and roller tube 106 may be arranged in other configurations. For example, motor 104 may be disposed outside roller tube 106 and aligned with roller tube 106 (e.g., end-to-end). Further, while example architectural covering 100 is illustrated with example covering 102, it is understood that example architectural covering 100 may be implemented with any type of covering, such as conventional draperies, shutters, horizontal and vertical blinds, and various other kinds of shades, including roller and cellular shades, etc.

In accordance with one aspect of this disclosure, the drive coupling includes one or more vibration-absorbers that are used to reduce vibration between the parts of the architectural covering. For example, the drive coupling may include a driver that connects to the output shaft of the motor and a tube adapter that connects to the roller tube. The driver rotates the tube adapter to rotate the roller tube. In accordance with one aspect of this disclosure, vibration-absorbers are utilized between the driver and the tube adapter to reduce vibration and, thus, to reduce potential noise in an architectural covering. For example, the driver may include a set of mounting structures, such as posts, extending outwardly from a plate in a direction that is parallel to and offset from a rotational axis of the driver. The tube adapter may include a central portion, disposed between the posts, and a set of arms extending outwardly from the central portion beyond the posts to engage the roller tube. As the driver rotates, the posts rotate the tube adapter and, thus, rotate the roller. In accordance with one aspect of the disclosure, the vibration-absorbers are located between the posts of the driver and the tube adapter. In accordance with one aspect of this disclosure, the vibration-absorbers may be embodied as elastic rings. For example, an elastic ring may be disposed on each post, and the arms of the tube adapter may be engaged by the elastic rings. Thus, the tube adapter is indirectly coupled to the driver by the elastic rings. In one aspect of the disclosure, the elastic rings are implemented as grommets. The interface between the driver, the vibration-absorbers, and the tube adapter results in decreased vibration, which greatly reduces and/or eliminates noise that would otherwise be generated by a traditional connection.

Figure 2:
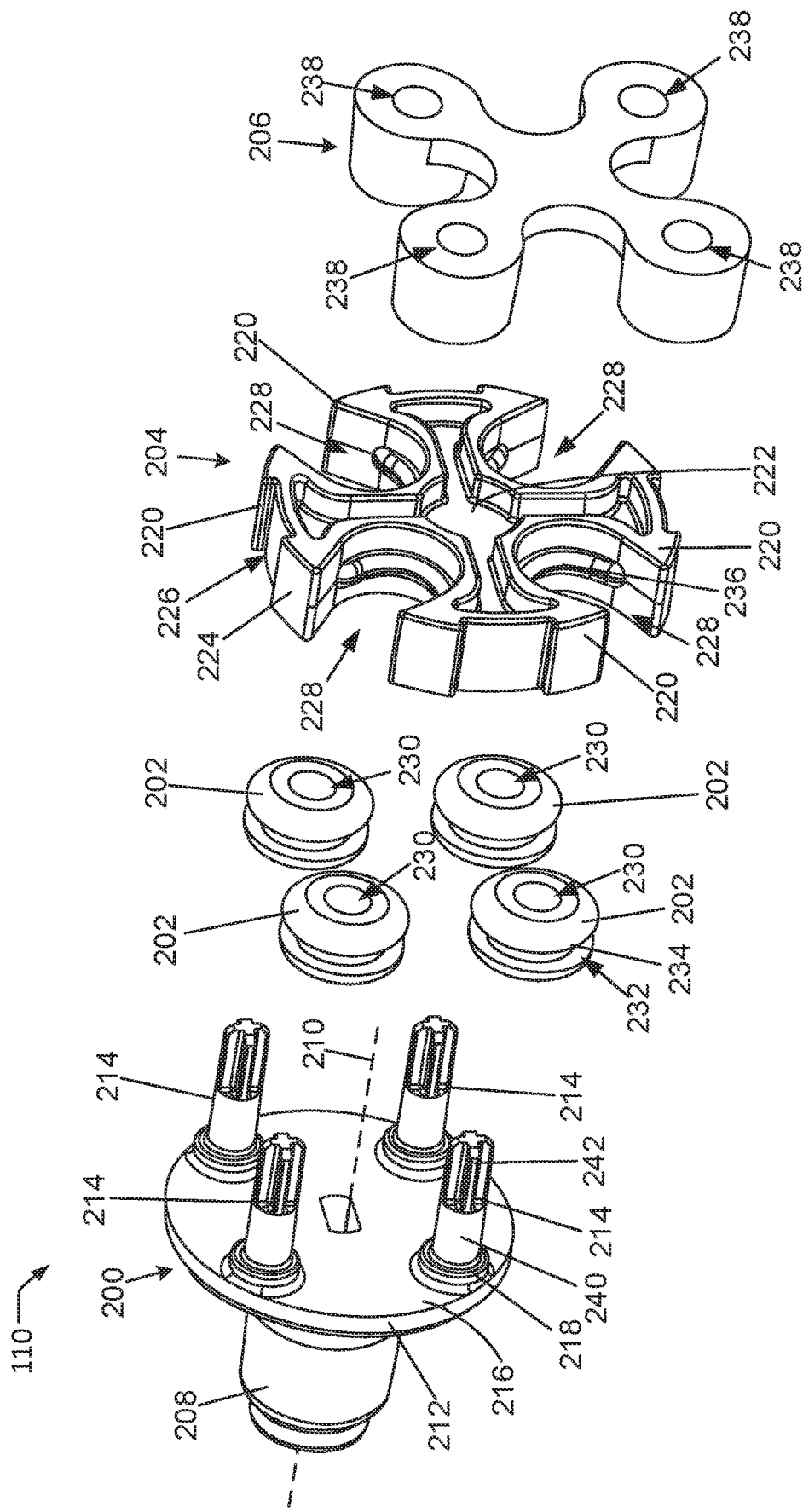
FIG. 2 is an exploded view of the example of the drive coupling of FIG. 1.

For example, FIG. 2 is an exploded view of example drive coupling 110. In the illustrated example, drive coupling 110 includes a driver 200, a set of elastic rings 202, a tube adapter 204 (e.g., a cog) and a retainer 206. Driver 200 includes a mounting shaft 208 that is configured to be coupled to motor output shaft 108 of motor 104 (FIG. 1). In one aspect of this disclosure, mounting shaft 208 includes an opening to receive motor output shaft 108, as disclosed in further detail in conjunction with FIG. 5. When coupled to motor output shaft 108, motor 104 rotates driver 200 about a rotational axis 210 (e.g., a central or longitudinal axis of driver 200). In one aspect of this disclosure, rotational axis 210 is substantially aligned with the rotational axis of motor output shaft 108 of motor 104. In the illustrated example of FIG. 2, driver 200 includes a plate 212 coupled to mounting shaft 208. Plate 212 is oriented perpendicular to rotational axis 210. Driver 200 includes a set of posts 214 that are coupled to and extend from a face 216 of plate 212. In the illustrated example, driver 200 includes four posts 214. However, in other aspects of this disclosure, driver 200 may include more (e.g., five posts, six posts, etc.) or fewer posts (e.g., three posts, two posts, one post). Posts 214 are parallel to and offset from rotational axis 210. As such, when driver 200 is rotated, posts 214 rotate around rotational axis 210. In the illustrated example of FIG. 2, posts 214 are spaced equidistant from rotational axis 210 and are arranged in a square pattern around rotational axis 210. However, in other aspects of this disclosure, posts 214 may be arranged in other configurations and/or may be spaced closer to or further from rotational axis 210 and/or one another.

Figure 4:
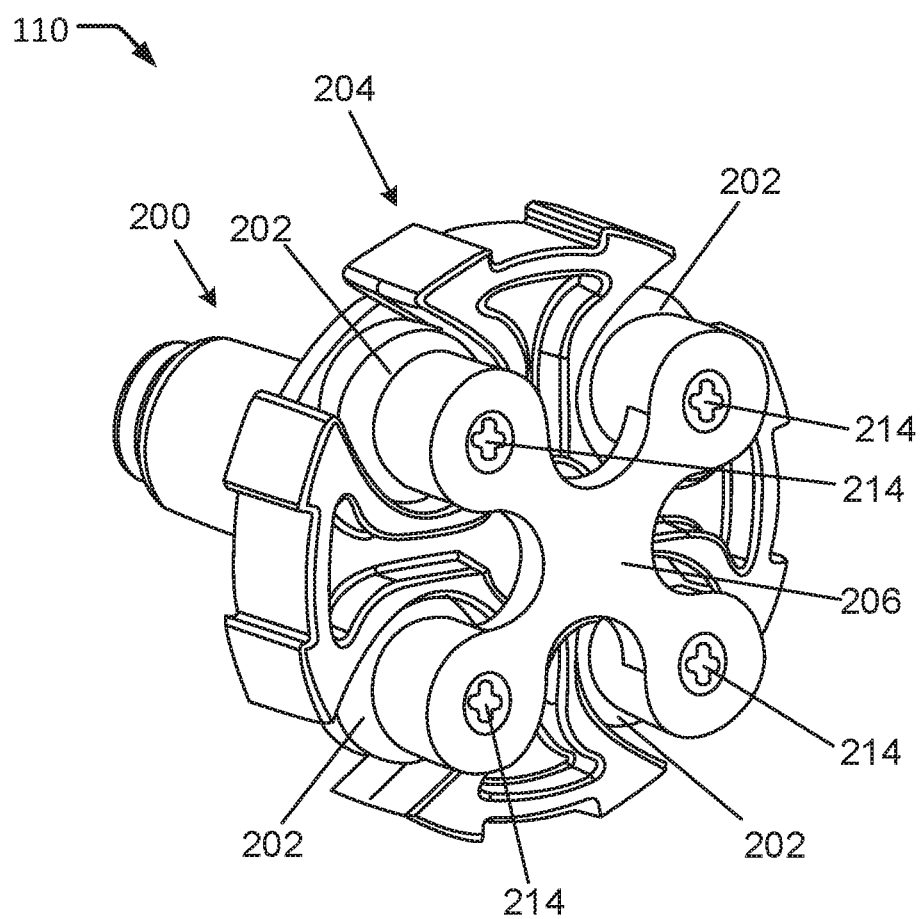
FIG. 4 is a perspective view of the example of the drive coupling of FIG. 2 in an assembled state.
Figure 5:
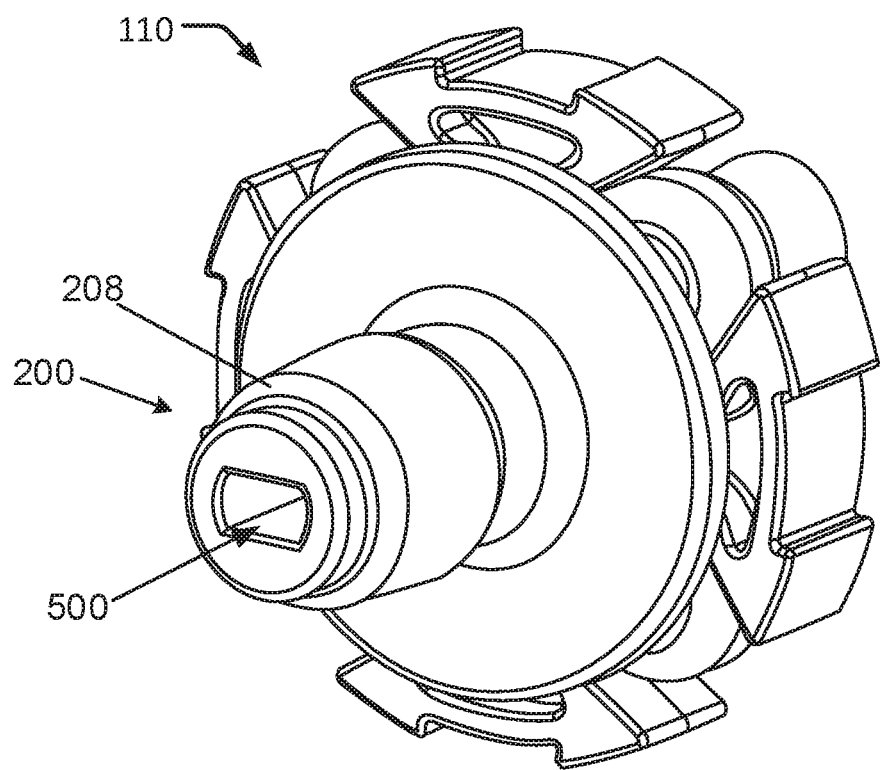
FIG. 5 is another perspective view of the example of the drive coupling of FIG. 2 in an assembled state.

In the illustrated example of FIG. 2, plate 212 includes raised surfaces 218 (one of which is referenced in FIG. 2) where posts 214 extend from face 216 of plate 212. When drive coupling 110 is assembled (as illustrated in FIGS. 4 and 5), raised surfaces 218 separate elastic rings 202 from face 216 of plate 212. In other aspects, no raised surfaces may be implemented.

In one aspect of this disclosure, driver 200 is constructed as a substantially unitary part or component. For example, driver 200 may be molded as a single part or component and/or machined from a single piece of material (e.g., zinc). In another aspect of this disclosure, driver 200 may be constructed of multiple parts or components that are coupled together (e.g., posts 214 may be welded to plate 212, plate 212 may be welded to mounting shaft 208, etc.).

In one aspect of the disclosure, a tube adapter may be included in the drive coupling to transfer rotational motion from the driver to the roller tube. The tube adapter may include one or more features that mate with or engage one or more features on the roller tube. In accordance with one aspect of this disclosure, the tube adapter includes a central portion and a plurality of arms extending from the central portion. The arms may include the features to engage the roller tube (e.g., to engage an inner surface of the roller tube). In accordance with one aspect of this disclosure, the central portion of the tube adapter is disposed between the posts of the driver, and the arms extend outwardly beyond the posts to engage the roller tube. In one aspect of this disclosure, the tube adapter may be interchangeable with one or more other tube adapters having different features and/or sizes for interfacing with other roller tubes.

For example, referring back to FIG. 2, to transfer rotational motion from driver 200 to roller tube 106 (FIG. 1), drive coupling 110 includes tube adapter 204. Tube adapter 204 engages roller tube 106. In particular, tube adapter 204 includes arms 220 that extend outwardly from a central portion 222. In the illustrated example, tube adapter 204 includes four arms 220. However, in other aspects of this disclosure, tube adapter 204 may include more or fewer arms 220. An end 224 of each arm 220 includes a first feature, implemented as a slot 226 (e.g., a female feature) (one of which is referenced in FIG. 2), that mates with a second feature (e.g., a male feature) on an inner surface of roller tube 106, as disclosed in further detail in conjunction with FIG. 7. In the illustrated example of FIG. 2, arms 220 form a cross-shape. Curved or arc-shaped notches 228 are formed between adjacent arms 220. In the illustrated example, tube adapter 204 has four notches 228, one between each adjacent pair of arms 220. In one aspect of the disclosure, the number of posts 214 (and, thus, the number of elastic rings 202) corresponds to the number of notches 228. In one aspect of the disclosure, using four posts 214 with four elastic rings 202 results the optimal reduction in noise generated by architectural covering 100. In other aspects of this disclosure, with more or fewer arms 220, tube adapter 204 may have more or fewer notches 228 and, thus, more or fewer posts 214 may be used.

Figure 3:
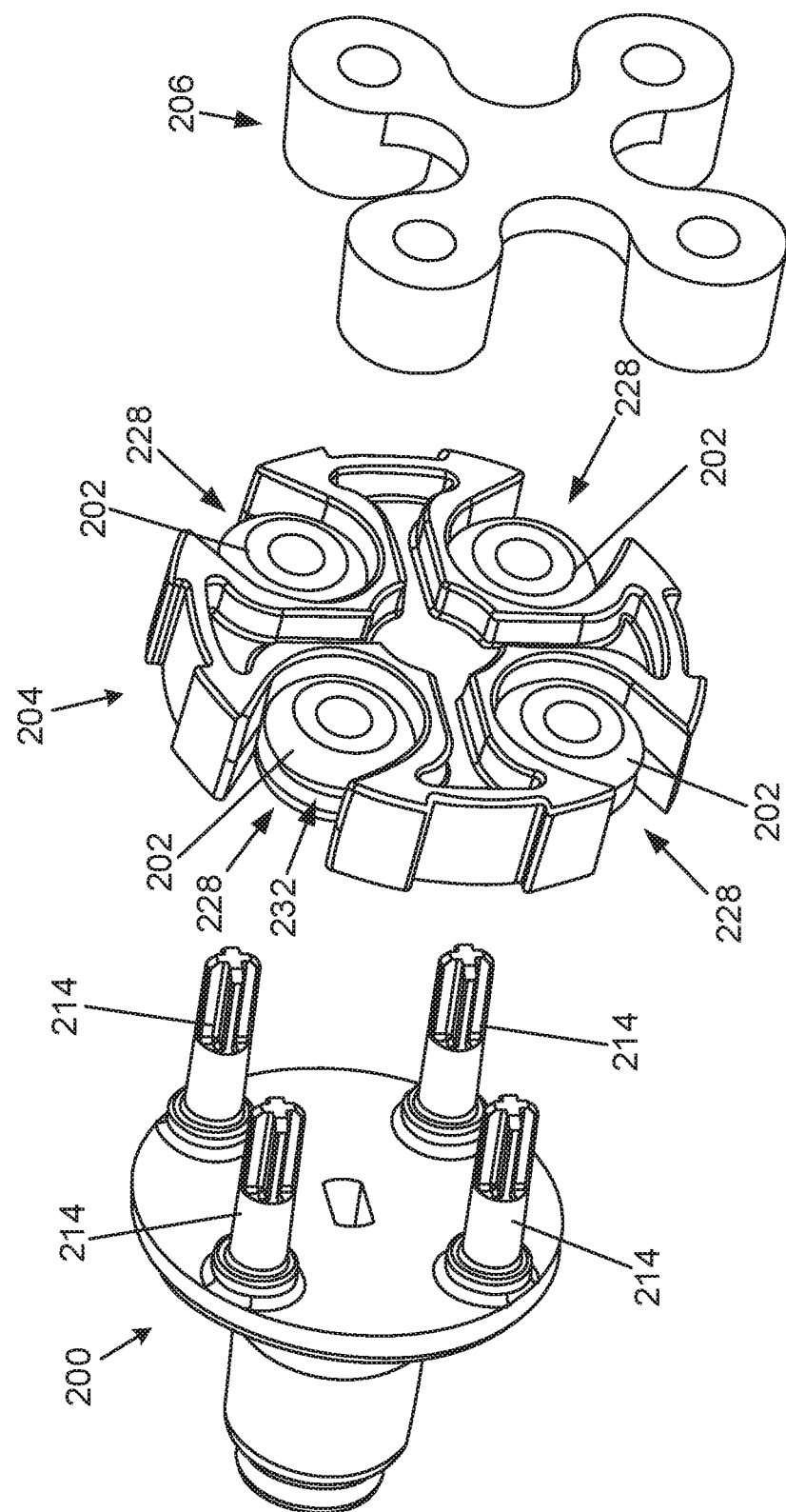
FIG. 3 is a perspective view of the example of the drive coupling of FIG. 2 in a partially assembled state.

In accordance with one aspect of this disclosure, one or more parts for absorbing vibration are included in the drive coupling to dampen vibration and, thus, reduce potential noise. The vibration-absorber(s) may be constructed of a lower durometer material (e.g., Shore A material). The vibration-absorber(s) may be interposed in one or more locations between the relatively harder part(s) of the drive coupling. For example, the vibration-absorbers may be disposed between the driver and a driven member, such as the tube adapter. In one aspect of this disclosure, the vibration-absorbers are implemented as elastic rings. For example, referring to FIG. 1, drive coupling 110 includes elastic rings 202. In the illustrated example, elastic rings 202 are implemented as grommets. However, in other aspects of the disclosure, other types of elastic rings may be implemented. Each elastic ring 202 includes an opening 230 to receive a respective one of posts 214. In the illustrated example, each elastic ring 202 includes a groove 232 (one of which is referenced in FIG. 2) formed in an outer edge 234 of the respective elastic ring 202. To mate with grooves 232, each notch 228 on tube adapter 204 includes a rib or web 236 (one of which is referenced in FIG. 2). Each web 236 is located between adjacent arms 220. As illustrated in FIG. 3, when drive coupling 110 is being assembled, elastic rings 202 are inserted into notches 228. In this arrangement, webs 236 (FIG. 2) fit into grooves 232 of elastic rings 202.

In the illustrated example, elastic rings 202 may be used to carry tube adapter 204 when elastic rings 202 are placed on posts 214. In other words, the elastic rings 202 are interposed between driver 200 and tube adapter 204 to reduce (e.g., minimize) or eliminate contact between driver 200 and tube adapter 204. In the illustrated example, tube adapter 204 is operatively engaged with elastic rings 202. Elastic rings 202 absorb vibration that may otherwise cause acoustic waves (e.g., sound) between driver 200 and tube adapter 204 (and, thus, roller tube 106 (FIG. 1)). Further, in one aspect of the disclosure, elastic rings 202 may be coupled to posts 214 and tube adapter 204 (e.g., via webs 236 and grooves 232) with minimal clearance, which reduces backlash. For instance, the thin wall sections (on either side of grooves 232) of elastic rings 202 may be disposed in compression during use, which allows for isolating vibration while minimizing backlash. Backlash is the clearance between the forward motion and backward motion between driver 200 and tube adapter 204 that results when switching direction of rotation (e.g., between extending and retracting covering 102 (FIG. 1)). Backlash may be an effect generated by a covering that disposes the weight alternately from one side to the other side of a rotating member. Elastic rings 202 keep driver 200 and tube adapter 204 in relatively intimate contact without excess clearance to minimize backlash.

In one aspect of the disclosure, elastic rings 202 are constructed of a material that is resilient or elastic enough (e.g., non-viscoelastic) to return to its original shape after being compressed, but soft enough to be compressed when torqued between driver 200 and tube adapter 204 (and, thus, to absorb vibrations therebetween). For example, elastic rings 202 may be constructed of materials having a durometer of about 40 Shore A and above, at increments of 1, and/or a durometer of about 65 Shore A and below, at increments of 1. In accordance with one aspect of the disclosure, elastic rings 202 are constructed of 50 Shore A nitrile rubber (known as Buna-N). In other aspects of the disclosure, elastic rings 202 may be constructed of other materials, such as a polyurethane. Driver 200 and tube adapter 204 may be constructed of a higher durometer materials (e.g., to withstand higher torques). For example, driver 200 may be constructed of zinc, nylon, and/or a polycarbonate alloy, and tube adapter 204 may be constructed of acetal, which has optimal lubricity and toughness. Alternatively, in other aspects of the disclosure, driver 200 and/or tube adapter 204 may be constructed of other materials.

In accordance with one aspect of this disclosure, a retainer may be provided to hold elastic rings (and, thus, tube adapter) on the driver. For example, referring back to FIG. 2, drive coupling 110 includes retainer 206, which may be coupled to posts 214 of driver 200 after elastic rings 202 and tube adapter 204 are coupled to driver 200. In particular, retainer 206 includes four openings 238 to receive posts 214. For example, FIG. 4 shows an assembled view of drive coupling 110 where elastic rings 202 are disposed on posts 214 and retainer 206 is coupled to posts 214 to retain elastic rings 202 on posts 214. An example process of assembling drive coupling 110 may include inserting posts 214 into elastic rings 202 (i.e., placing elastic rings 202 on posts 214), and then pressing tube adapter 204 between posts 214 such that elastic rings 202 are inserted into notches 228 of tube adapter 204. Another example assembly process may include inserting elastic rings 202 into notches 228 of tube adapter 204 first (as depicted in FIG. 3), and then inserting posts 214 into elastic rings 202. After elastic rings 202 are on posts 214 and tube adapter 204 is disposed between posts 214 and operatively engaged with elastic rings 202, retainer 206 may be placed onto posts 214 to retain tube adapter 204 and elastic rings 202 on posts 214.

Referring back to FIG. 2, each post 214 includes a first section 240 (one of which is referenced in FIG. 2) have a circular cross-section and a second section 242 having a cross-shaped cross-section (one of which is referenced in FIG. 2). When drive coupling 110 is assembled, each elastic ring 202 is disposed on first section 240 of the corresponding post 214, and retainer 206 is disposed on second sections 242 of posts 214. Second sections 242 are shaped to provide an interference fit with retainer 206. In other words, retainer 206 may be coupled to posts 214 by pressing retainer 206 onto posts 214. In other aspects of the disclosure, first section 240 and/or second section 242 may be shaped differently. For example, the second section 242 may be have a square-shaped cross-section. Additionally or alternatively, in other aspects of the disclosure, other chemical and/or mechanical fasteners may be used to couple retainer 206 and posts 214. For example, instead of using retainer 206, the ends of posts 214 may include nubs (e.g., similar to nubs 1720 disclosed in connection with first driver 1700 of FIG. 17) to retain elastic rings 202 on posts 214.

FIG. 5 shows another perspective view of assembled drive coupling 110. In the illustrated example of FIG. 5, mounting shaft 208 of driver 200 includes an opening 500 (sometimes referred to as an output shaft opening) to receive motor output shaft 108 of motor 104 (FIG. 1). In one aspect of the disclosure, driver 200 is coupled to motor output shaft 108 via an interference fit. In another aspect of the disclosure, driver 200 is coupled to motor output shaft 108 via a set screw (a screw extending through mounting shaft 208 into motor output shaft 108). Additionally or alternatively, in another aspect of the disclosure, other chemical and/or mechanical fasteners may be used to couple driver 200 and motor output shaft 108.

In accordance with one aspect of this disclosure, the elastic rings are implemented as grommets. The elastic rings have an outer diameter and an inner diameter. In accordance with one aspect of this disclosure, each elastic ring includes a groove around an edge or circumferential surface of the elastic ring.

Figure 6A:
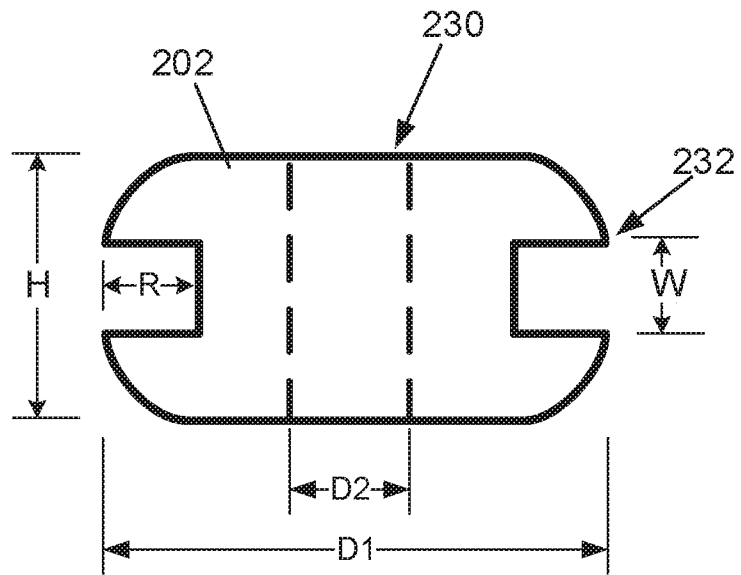
FIG. 6A is a side view of an example of an elastic ring employed in the example of the drive coupling of FIG. 1.
Figure 6B:
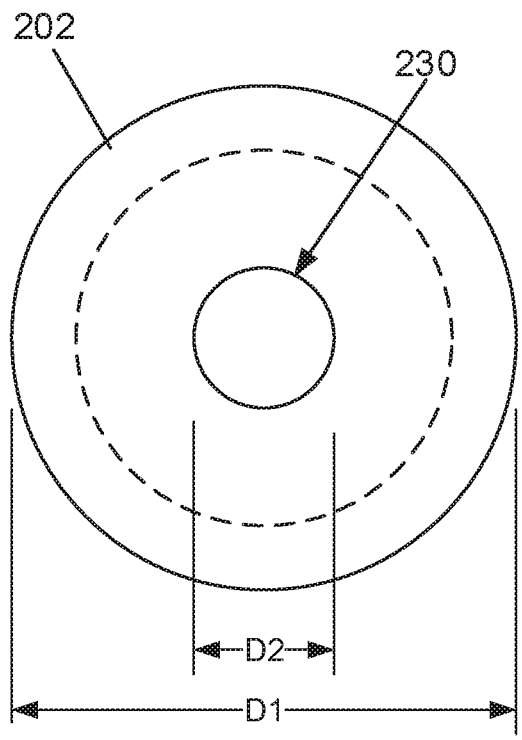
FIG. 6B is a top view of the example of the elastic ring of FIG. 6A.

For example, FIG. 6A is a side view of one of elastic rings 202 and FIG. 6B is a top or plan view of elastic ring 202. As illustrated in FIGS. 6A and 6B, elastic ring 202 has a height H (or thickness), an outer diameter D1, and an inner diameter D2 (which is the diameter of opening 230). In one aspect of the disclosure, height H is about 0.1875 inches (in) (4.7625 millimeters (mm)) (e.g., ±0.003 in (0.076 mm)) and outer diameter D1 is about 0.3437 in (8.7313 mm) (e.g., ±0.003 in (0.076 mm)). In other aspects of the disclosure, height H and/or outer diameter D1 may be larger or smaller. In one aspect of the disclosure, the clearance or difference between inner diameter D2 and a diameter of the respective post 214 (FIG. 2) is about 0.005 in (0.127 mm) (e.g., ±0.003 in (0.076 mm)). For example, inner diameter D2 may be about 0.125 in (3.175 mm) and the diameter of post 214 may be about 0.119 in (3.023 mm)±0.003 in (0.076 mm). This clearance results in the most noise reduction while still enabling easy assembly of elastic rings 202 on posts 214. In other aspects of this disclosure, inner diameter D2 of elastic ring 202 and/or the diameter of the respective post 214 may be larger or smaller. For example, depending on the durometer of elastic rings 202, the tolerance or clearance between posts 214 and elastic rings 202 may be larger or smaller. In some aspects of this disclosure, reducing a contact area between posts 214 and the inner surfaces of the respective elastic rings 202 reduces potential noise generated by vibrations between the components. Thus, the dimensions and clearances can be changed based on difference in size, the materials used, and/or a design configuration that that minimizes surface area contact. In other aspects of the disclosure, the dimensions of elastic rings 202 and/or posts 214 may be selected such that the contact area is not minimized (e.g., to couple elastic rings 202 tightly to posts 214 such that a relatively large contact area is produced).

As illustrated in FIG. 6A, groove 232 has a width W and a depth R. In one aspect of the disclosure, depth R may be about 0.047 in (1.1938 mm) (e.g., ±0.003 in (0.076 mm)). In other aspects of the disclosure, depth R may be larger or smaller. In one aspect of this disclosure, the clearance or difference between width W of groove 232 and a width of web 236 (FIG. 2) is about 0.005 in (or 0.127 mm) (e.g., ±0.003 in (0.076 mm)). For example, width W may be about 0.0625 in (1.5875 mm) and the width of web 236 may be about 0.087 in (2.21 mm) (e.g., ±0.003 in (0.076 mm)). This clearance results in minimal noise caused from vibration between the parts and components. In other aspects of this disclosure, the dimensions of width W and/or the width of web 236 may be larger or smaller.

Figure 7:
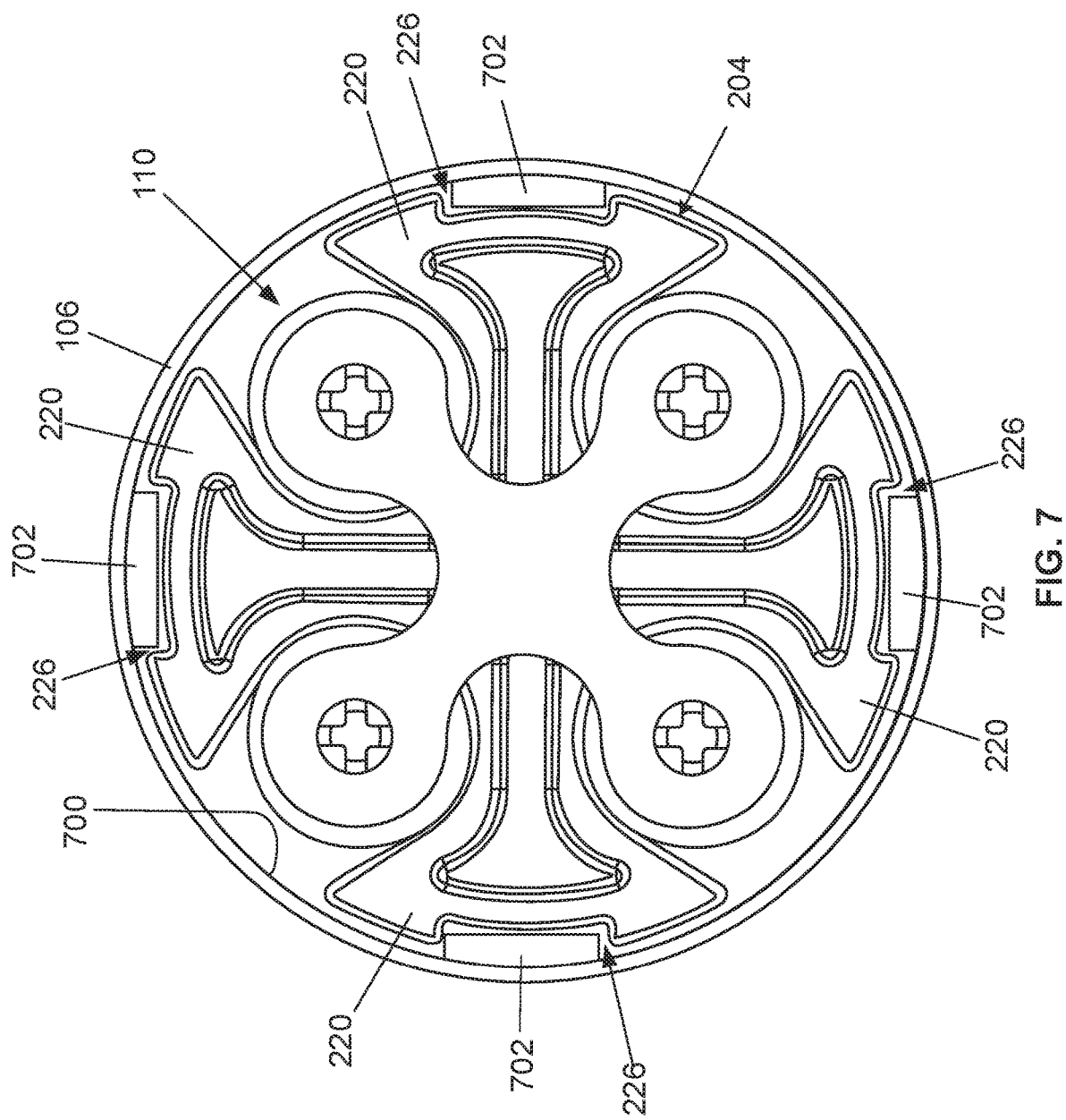
FIG. 7 is an end view of the example of the drive coupling of FIG. 1 implemented with an example of a roller tube.

FIG. 7 shows an end view of drive coupling 110 and roller tube 106. In the illustrated example, roller tube 106 includes an inner surface 700 having extensions 702 that extend radially inward from inner surface 700. Extensions 702 are spaced apart to match the arrangement of slots 226 on arms 220. As such, when drive coupling 110 is inserted into roller tube 106, extensions 702 are inserted into slots 226 in arms 220. Thus, when tube adapter 204 is rotated, roller tube 106 is rotated.

While in the illustrated example of FIG. 7 roller tube 106 includes four extensions 702 (one for each of slots 226), in other aspects of the disclosure, roller tube 106 may include more or fewer extensions. Likewise, tube adapter 204 may include more or fewer slots 226. For example, only one slot may be provided on one arm 220, and only one extension may be provided on inner surface 700 of roller tube 106. In other aspects of the disclosure, slots 226 and extensions 702 are reversed. For example, arms 220 may include extensions that extend from arms 220, and inner surface of roller tube 106 may include slots to receive the extensions on arms 220.

Figure 8:
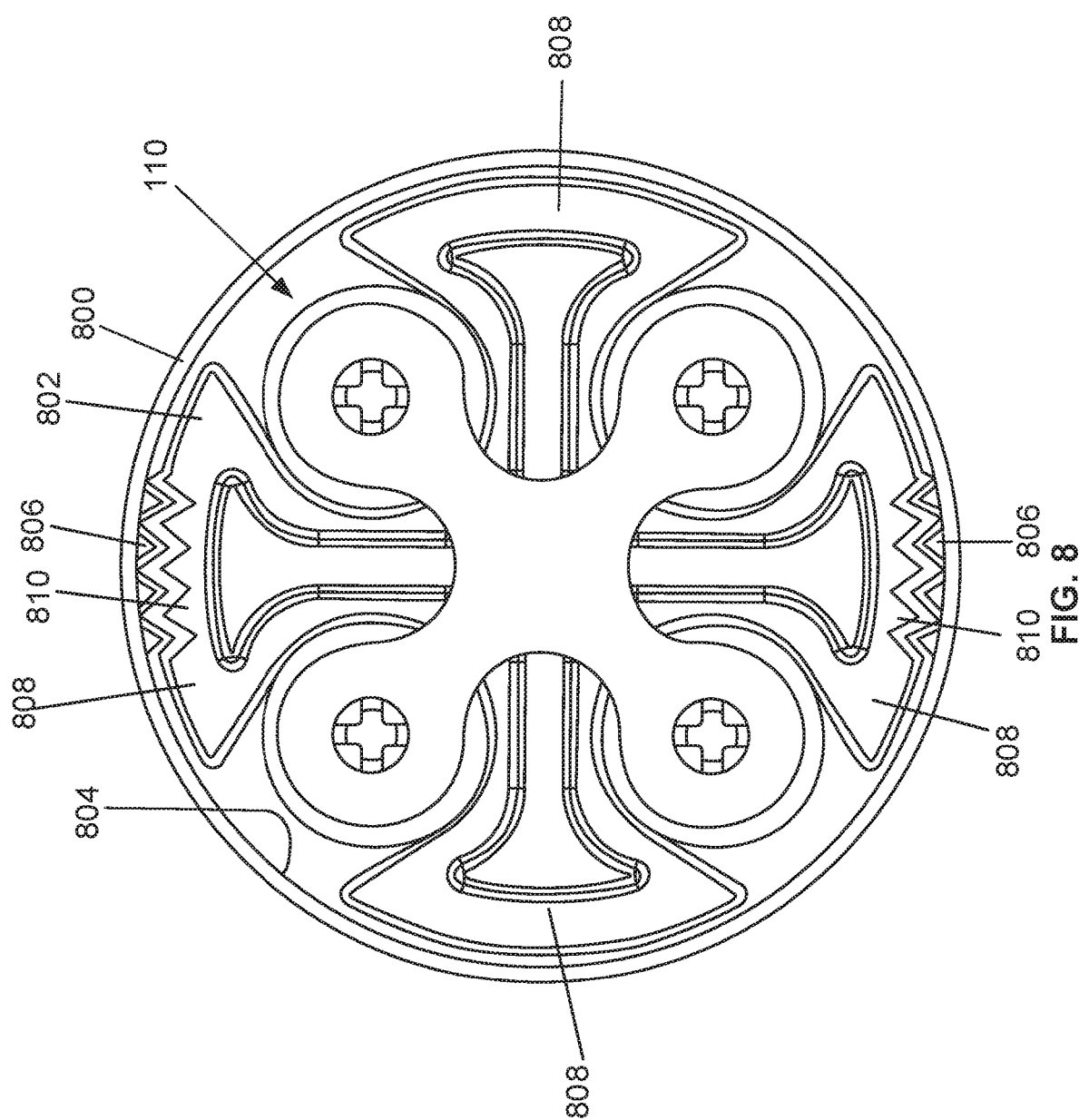
FIG. 8 is an end view of the example of the drive coupling of FIG. 1 implemented with another example of a roller tube.

In one aspect of the disclosure, tube adapter 204 may be interchanged with another tube adapter having a different design corresponding to a different roller tube. As such, drive coupling 110 can be used to drive a variety of different roller tubes. For example, FIG. 8 shows an end view of a second roller tube 800 and a second tube adapter 802 carried by driver 200. In the illustrated example, second roller tube 800 includes an inner surface 804 with two sections of teeth 806 extending inward from inner surface 804. Tube adapter 802 includes four arms 808, similar to tube adapter 204 of FIG. 2. Two of arms 808 include teeth 810 to mate with teeth 806 on second roller tube 800. In another aspect of this disclosure, second roller tube 800 may include more or fewer sections of teeth and second tube adapter 802 may include more or fewer matching sections of teeth. In another aspect of this disclosure, other shaped features may be used instead of teeth and/or the features may be spaced differently. Further, in one aspect of this disclosure, second tube adapter 802 may have longer or shorter arms than tube adapter 204 of FIG. 2. As such, drive coupling 110 can be used to drive roller tubes having larger or smaller diameters than roller tube 106. Thus, drive coupling 110 can be easily adapted to interact with a variety of different roller tubes.

In accordance with one aspect of this disclosure, one or more of the arms of the tube adapter may include one or more fingers extending radially outward from the arm(s) and engage the inner surface of the roller tube. The finger(s) increase the contact area between the tube adapter and the roller tube to further help reduce potential vibrations (and, thus, noise) between the drive coupling and the roller tube. The finger(s) may be flexible and may help maintain the tube adapter centered within the roller tube. The finger(s) may also help take up any radial tolerance or excess space between the ends of the arms of the tube adapter and the inner surface of the roller tube.

Figure 9:
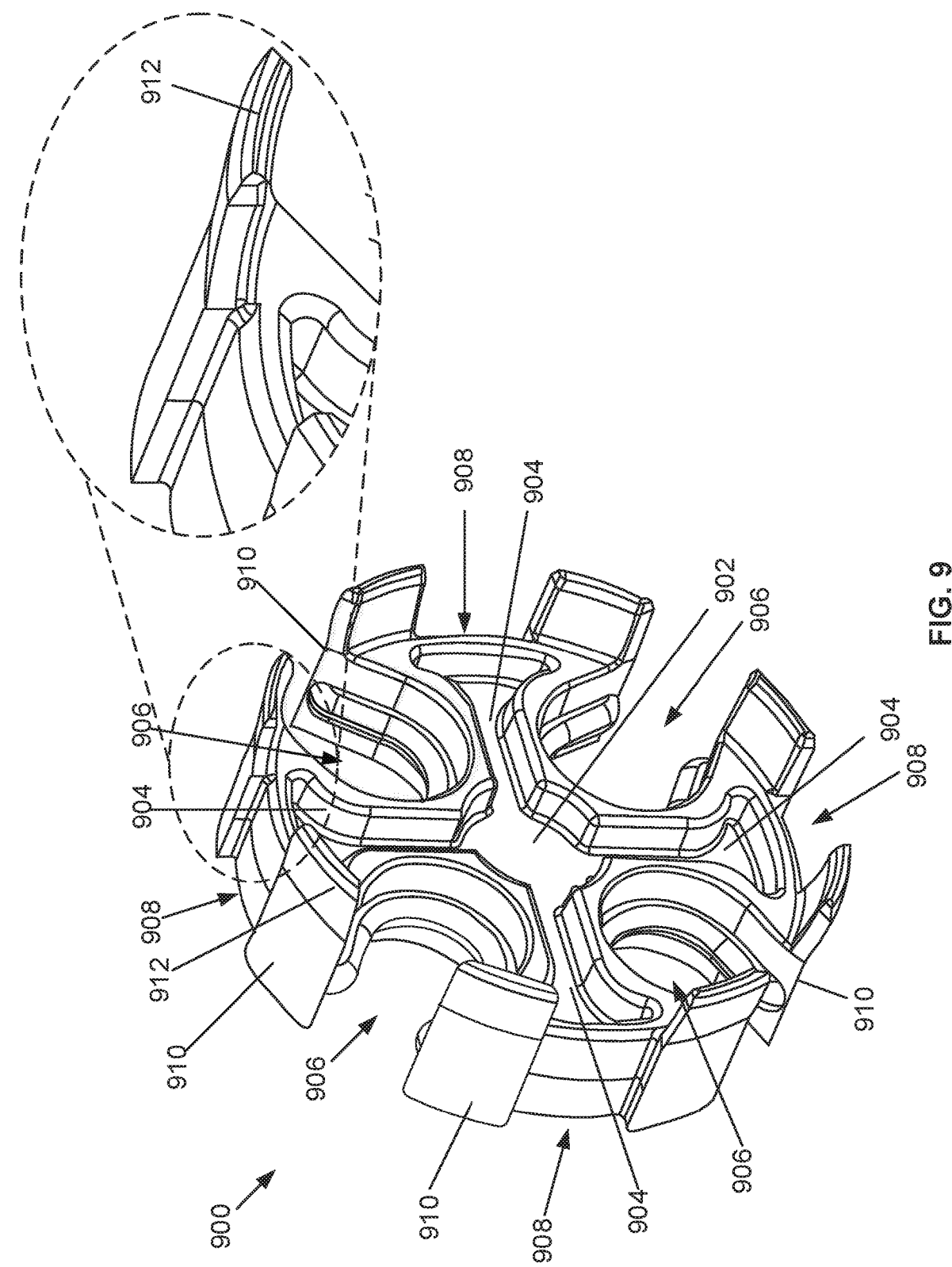
FIG. 9 illustrates an example of a tube adapter that may be implemented with the example of the drive coupling of FIG. 1.

FIG. 9 illustrates another tube adapter 900 that may be implemented with drive coupling 110. Tube adapter 900 is similar to tube adapter 204 (FIGS. 2 and 7) and includes a central portion 902, arms 904 that extend outwardly from central portion 902, curved notches 906 (to receive vibration-absorbers) formed between adjacent arms 904, and mating features, implemented in this example as slots 908, formed in ends 910 of arms 904 to mate with corresponding features on an inner surface of a rotating member, such as a roller tube (e.g., roller tube 106 of FIGS. 1 and 7). Additionally, tube adapter 900 includes fingers 912 (two of which are referenced in FIG. 9) that extend outward from ends 910 of arms 904 (in a direction along a central axis of tube adapter 900) and radially outward (e.g., upward) from ends 910 of arms 904, as can be seen in the callout in FIG. 9. Fingers 912 are flexible and biased outwardly to maintain contact with an inner surface of the roller tube to remove any clearance between the tube adapter and the roller tube (which may be a potential source of noise generation). For example, if tube adapter 900 is inserted into a roller tube, such as roller tube 106 of FIG. 7, fingers 912 are biased against inner surface 700 of roller tube 106. Fingers 912 increase the contact point with the roller tube 106 and take up any radial tolerance or excess clearance between tube adapter 900 and roller tube 106. Therefore, if there is a gap between ends 910 of arms 904 and inner surface 700 of the roller tube 106 (e.g., due to lower manufacturing tolerances), fingers 912 help to keep tube adapter 900 (and, thus, drive coupling 110) centered within the roller tube 106 and prevent movement of roller tube 106 and/or tube adapter 900 in the radial directions (which may otherwise cause vibration and, thus, noise). In some aspects of this disclosure, fingers 912 are not subject to any torsional forces when tube adapter 900 rotates roller tube 106. In other words, fingers 912 are not intended to engage extensions 702 on roller tube 106. Instead, fingers 912 help maintain tube adapter 900 centered, so that sufficient contact can be made between the inner surfaces of slots 908 in arms 904 and extensions 702 on roller tube 106 to transfer rotational motion from tube adapter 900 to roller tube 106 when tube adapter 900 is rotated. In the illustrated example, fingers 912 have a relatively small, negative rake angle to prevent fingers 912 from catching or snagging on inner surface 700 of roller tube 106 (e.g., during insertion and/or removal of the corresponding drive coupling from roller tube 106). In the illustrated example of FIG. 9, two fingers 912 are implemented on each arm 904 and are disposed on either side of the corresponding slot 908 on each arm 904. In other examples, more or fewer fingers 912 may be implemented and/or fingers 912 may be arranged in other configurations.

Figure 10:
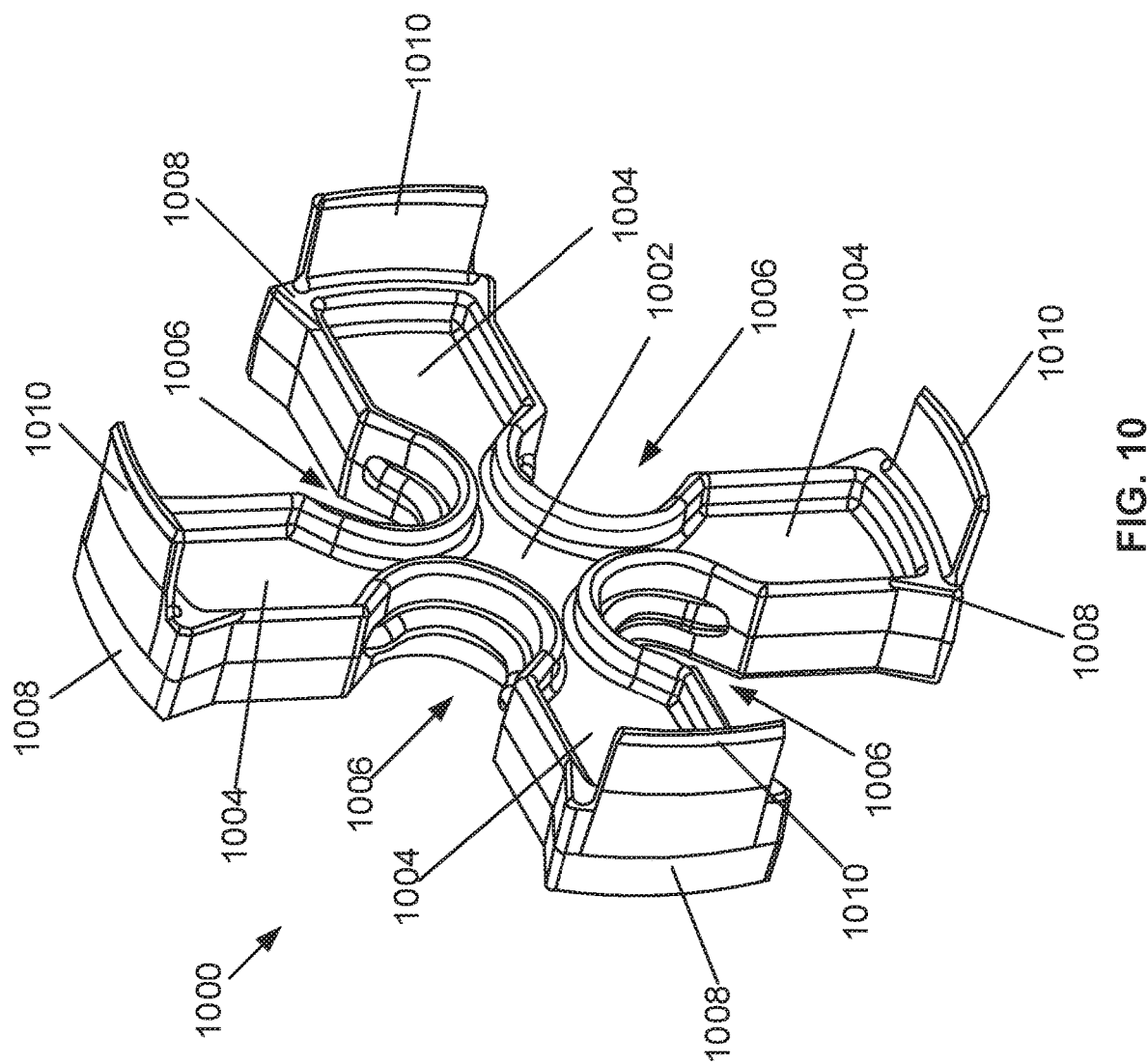
FIG. 10 illustrates another example of a tube adapter that may be implemented with the example of the drive coupling of FIG. 1.

FIG. 10 illustrates another tube adapter 1000 that may be implemented with drive coupling 110. Similar to tube adapter 204 (FIG. 2), tube adapter 1000 includes a central portion 1002, arms 1004 that extend outwardly from central portion 1002, and curved notches 1006 (to receive vibration-absorbers) formed between adjacent arms 1004. In the illustrated example of FIG. 10, arms 1004 are relatively straight (compared to arms 220 of tube adapter 204) and extend outwardly further than arms 220 of tube adapter 204. In the illustrated example, ends 1008 of arms 1004 are slightly enlarged (e.g., tapered outward) and configured to be inserted into corresponding slots or grooves formed on an inner surface of a roller tube. Additionally, in the illustrated example of FIG. 10, tube adapter 1000 includes fingers 1010 that extend outwardly from ends 1008 of arms 1004 (in a direction along a central axis of tube adapter 1000) and radially outward (e.g., upward) from ends 1008 of arms 1004. Similar to fingers 912 of tube adapter 900 (FIG. 9), fingers 1010 increase the contact surface of tube adapter 1000 with a roller tube and help center tube adapter 1000 within the roller tube, which reduces movement and, thus, potential vibrations between tube adapter 1000 and the corresponding roller tube. In other examples, more or fewer fingers 1010 may be implemented and/or fingers 1010 may be disposed in other locations.

Figure 11:
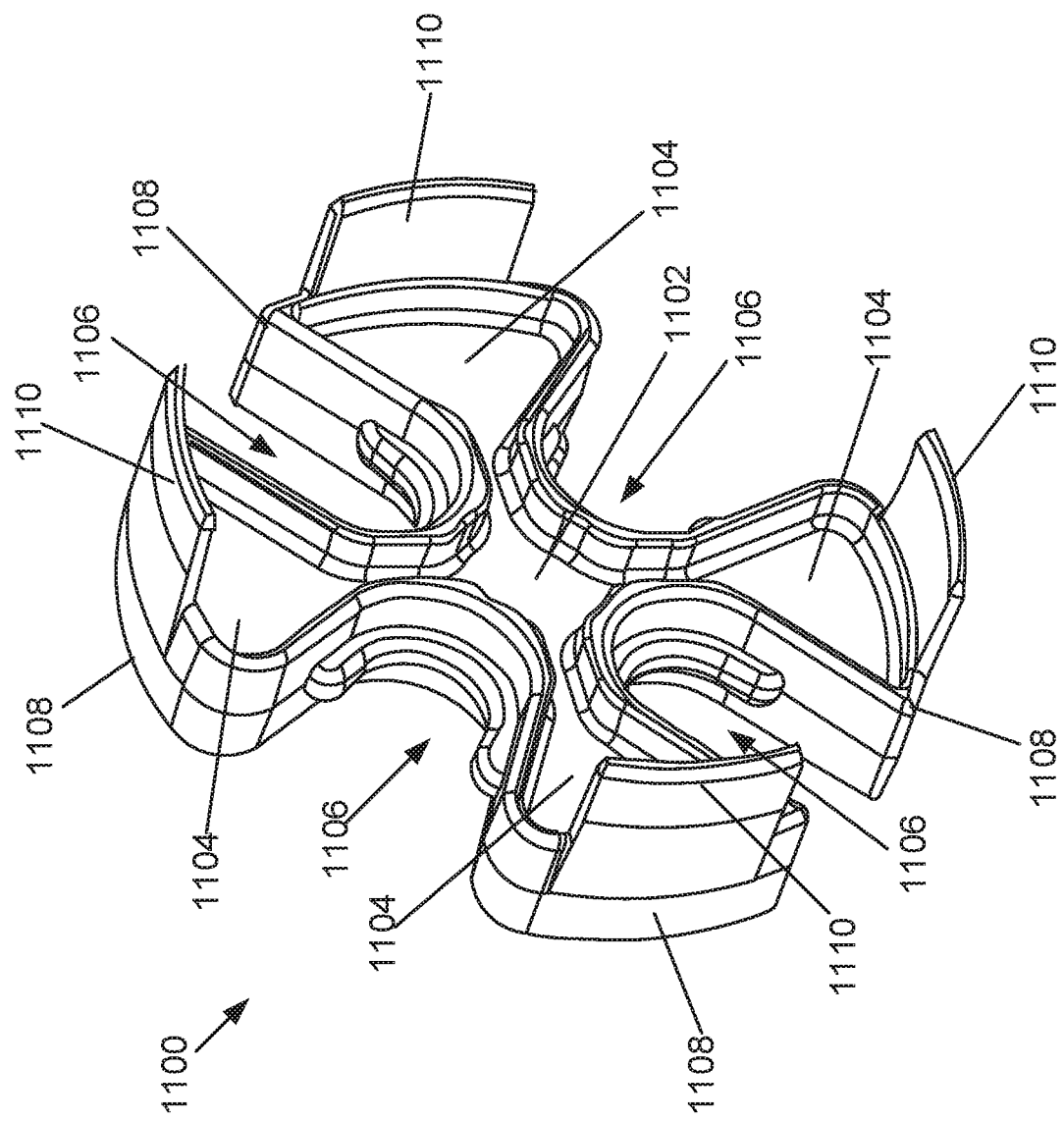
FIG. 11 illustrates another example of a tube adapter that may be implemented with the example of the drive coupling of FIG. 1.

FIG. 11 illustrates another tube adapter 1100 that may be implemented with drive coupling 110. Similar to tube adapter 204 (FIG. 2), tube adapter 1100 includes a central portion 1102, arms 1104 that extend outwardly from central portion 1102, and curved notches 1106 (to receive vibration-absorbers) formed between adjacent arms 1104. In the illustrated example of FIG. 11, arms 1104 are shaped similar to arms 220 of tube adapter 204. In the illustrated example, ends 1108 of arms 1104 are relatively wide and configured to be inserted into corresponding slots or grooves formed on an inner surface of a roller tube. Additionally, in the illustrated example of FIG. 11, tube adapter 1100 includes fingers 1110 that extend outwardly from ends 1108 of arms 1104 (in a direction along a central axis of tube adapter 1100) and radially outward (e.g., upward) from ends 1108 of arms 1104. Similar to fingers 912 of tube adapter 900 (FIG. 9), fingers 1110 increase the contact surface of tube adapter 1100 with a roller tube and help center tube adapter 1100 within the roller tube, which reduces movement and, thus, potential vibrations between tube adapter 1100 and the corresponding roller tube. In other examples, more or fewer fingers 1110 may be implemented and/or fingers 1110 may be disposed in other locations.

While in the illustrated example of FIGS. 1-11, tube adapters 204, 900, 1000, 1100 are configured to be disposed between posts 214 and elastic rings 202 with arms extending outwardly, beyond elastic rings 202 to engage roller tube 106, in other examples, a tube adapter may be disposed outside posts 214 and elastic rings 202. For example, a tube adapter in the form of a cylindrical sleeve may be disposed around elastic rings 202. An inner surface of the cylindrical sleeve may include grooves to receive respective ones of elastic rings 202. An outer surface of the cylindrical sleeve may have one or more features (e.g., similar to slots 226 on arms 220 of tube adapter 204) to mate with corresponding features on inner surface 700 of roller tube 106. Rotational motion may be similarly transferred to the cylindrical sleeve by rotating driver 200, which interfaces with the cylindrical sleeve via the elastic rings 202.

As mentioned above, driver 200 (FIG. 2) includes opening 500 (FIG. 5) to receive motor output shaft 108 (FIG. 1). Opening 500 should be configured to contact motor output shaft 108 along a sufficient length or in multiple contact locations/points to keep driver 200 centered with respect to motor output shaft 108. One example manufacturing process that may be used to construct driver 200 is die casting. Die casting is a relatively fast and inexpensive process for making metallic parts. Die casting includes forcing molten metal into a mold cavity formed by two or more dies. After the metal hardens, the dies are separated and the resulting part is ejected. To die cast driver 200, for example, opening 500 may be formed by a pin that is disposed in the mold cavity. When, the pin is removed after the metal hardens, the resulting void forms opening 500 through mounting shaft 208. The pin is tapered at a draft angle so that the pin can be removed after the mold is opened. However, using a single tapered pin may result in a tapered or angled opening that may not be desirable because only minimal contact would be achieved between motor output shaft 108 and the inside of opening 500. In other words, only the smallest diameter portion of the tapered opening may form the contact location with the motor output shaft. With such a small contact location, driver 200 may become misaligned on the motor output shaft. Further, driver 200 may wobble or vibrate on the motor output shaft, which generates noise.

Figure 12:
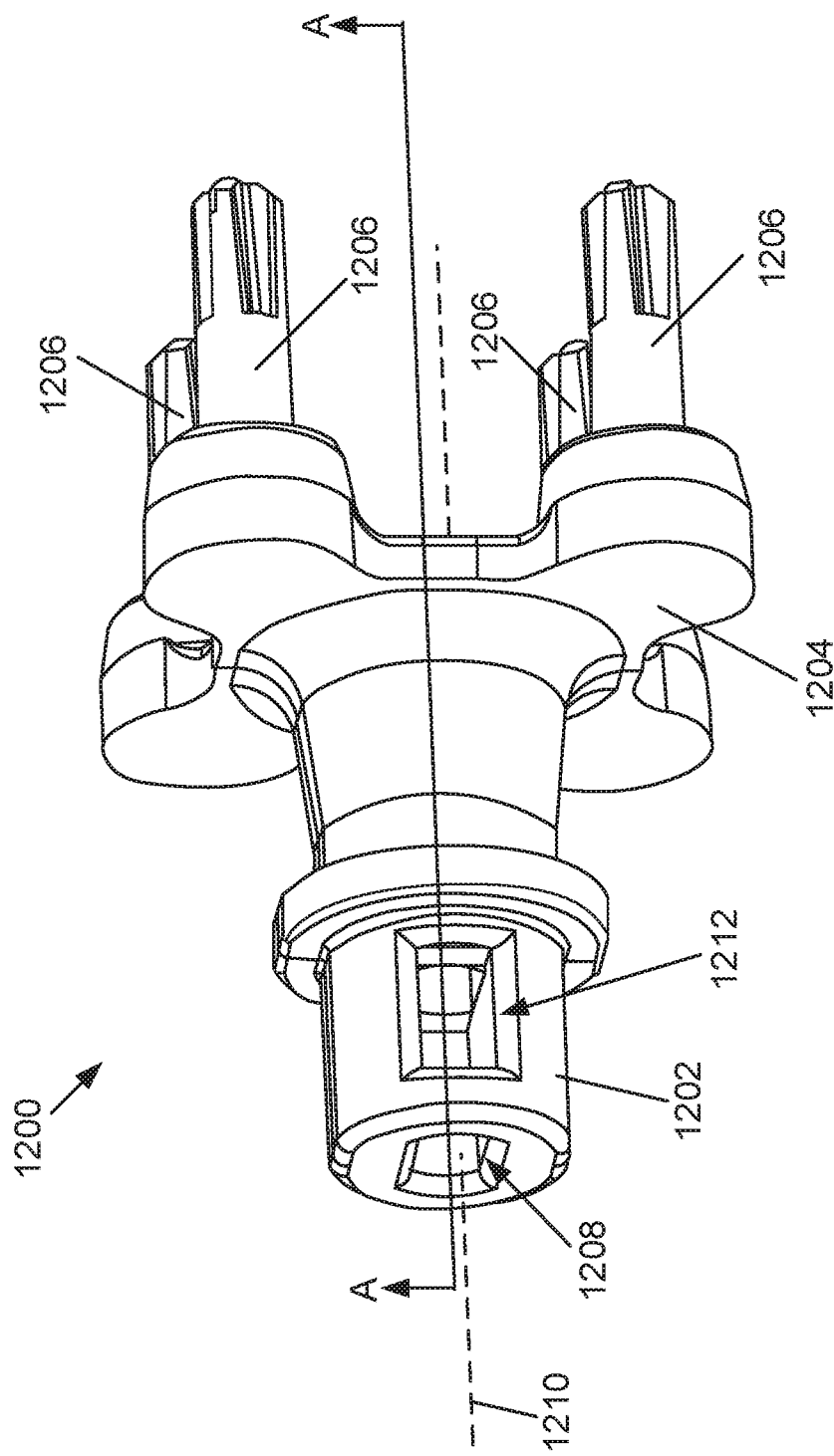
FIG. 12 is a perspective view of an example of a driver, which may be implemented in the example of the drive coupling of FIG. 1, and which may be constructed using a die casting process.

FIG. 12 illustrates an example driver 1200 that may be manufactured via a die casting process and is designed to overcome the above issues. In particular, driver 1200 includes an opening for a motor output shaft that is configured to have better alignment with the motor output shaft and form a relatively tight fit with the motor output shaft and, thus, results in reduced vibrations (and potential noise) between driver 1200 and the motor output shaft. Driver 1200 may be used as an alternative to driver 200 or the example manufacturing process described below may be similarly performed on driver 200 (or any other drivers disclosed herein) to address the above challenges. Driver 1200 is similar to driver 200 and includes a mounting shaft 1202, a plate 1204, and a set of posts 1206 extending from plate 1204. Mounting shaft 1202 includes an opening 1208 (sometimes referred to as an output shaft opening) to receive a motor output shaft, such as motor output shaft 108 (FIG. 1). Opening 1208 extends along a rotational axis 1210 (e.g., a central or longitudinal axis) of driver 1200. In the illustrated example, mounting shaft 1202 is formed with a transverse opening 1212 that extends through mounting shaft 1202 in a direction that is perpendicular to opening 1208 (e.g., transverse opening 1212 extends along an axis that is perpendicular to rotational axis 1210). Transverse opening 1212 enables multiple pins to be used during the die casting process to form a more desirably shaped opening, as discussed in further detail below in conjunction with FIG. 14. In the illustrated example, opening 1208 has a shape that is rectangular with curved sides. The shape of opening 1208 is configured to substantially match the shape of the corresponding motor output shaft. In other examples, the shape of opening 1208 may be different (e.g., a star, a triangle, etc.).

Figure 13:
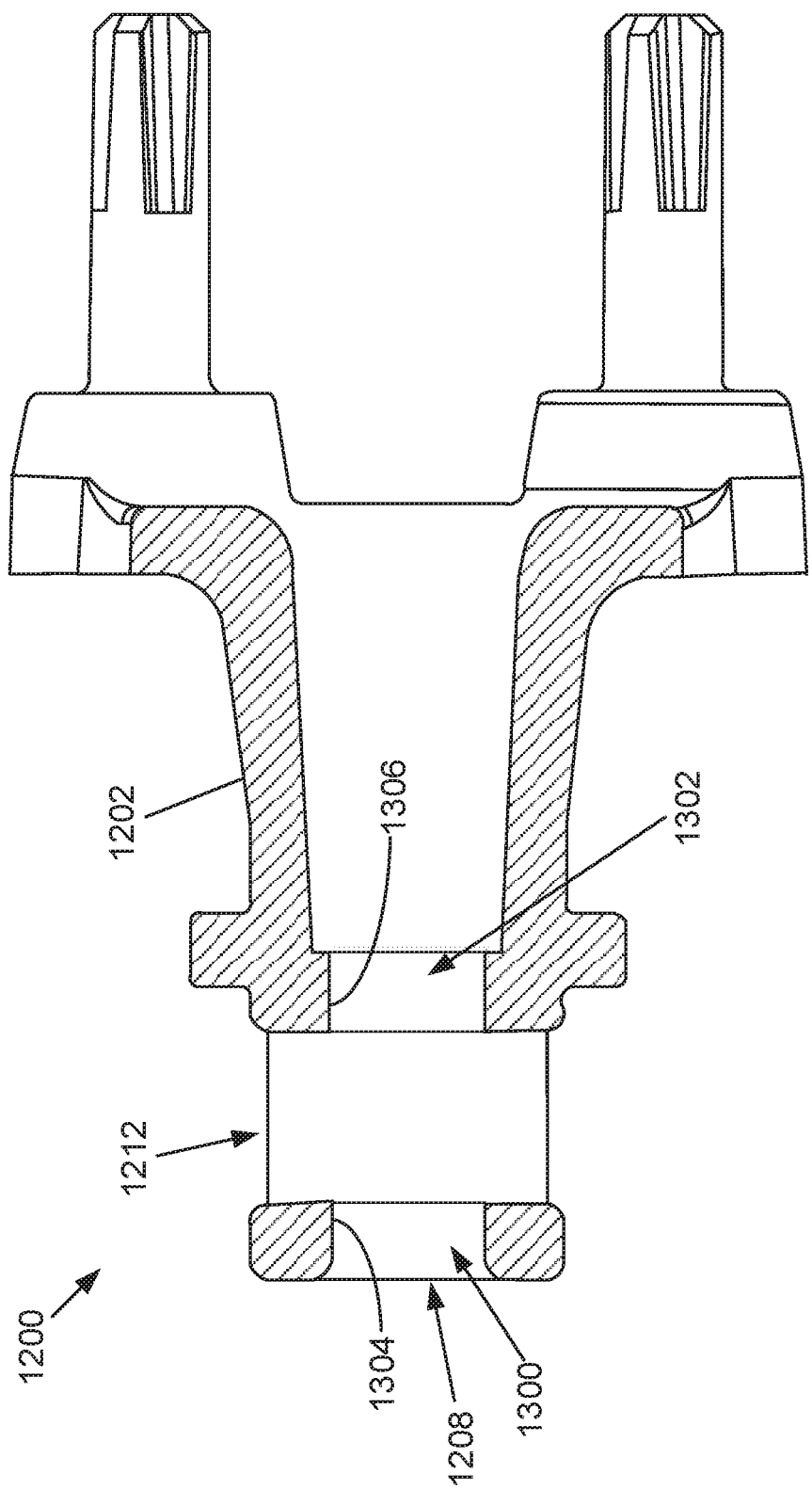
FIG. 13 is a cross-sectional view of the example of the driver of FIG. 12 taken along line A-A of FIG. 12.

FIG. 13 is a cross-sectional view of driver 1200 taken along line A-A of FIG. 12. As shown in the illustrated example, transverse opening 1212 extends through mounting shaft 1202 and intersects opening 1208. In the illustrated example, opening 1208 is divided into a first channel 1300 on one side of transverse opening 1212 (the left side in FIG. 13) and a second channel 1302 on the other side of transverse opening 1212 (the right side in FIG. 13). First and second channels 1300, 1302 are slightly tapered inward (as discussed in further detail in conjunction with FIG. 14). The smallest diameter portion of first channel 1300 forms a first contact location 1304 and the smallest diameter portion of second channel 1302 forms a second contact location 1306. First and second contact locations 1304, 1306 are configured to engage a motor output shaft (as discussed in further detail in conjunction with FIG. 15).

Figure 14:
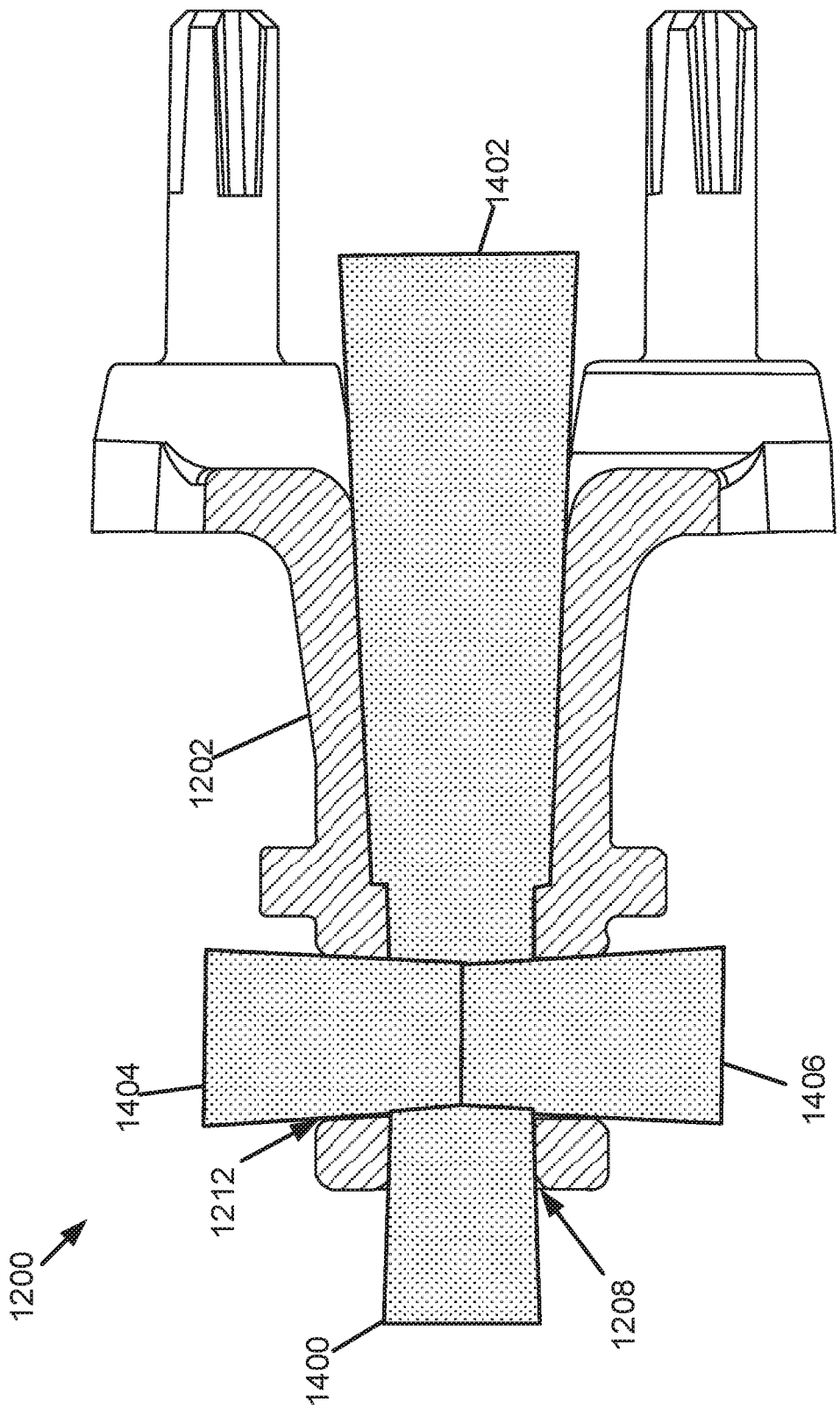
FIG. 14 illustrates the example of the driver of FIG. 13 showing an example of a pin arrangement that may be used to form openings in the example of the driver during the die casting process.

FIG. 14 shows an example configuration of the pins that may be used during the die casting process to form opening 1208 and transverse opening 1212 in driver 1200. As illustrated, when forming driver 1200, a first pin 1400 extends into mounting shaft 1202 from one side (the left side in FIG. 14) and a second pin 1402 extends into mounting shaft 1202 from the opposite side (the right side in FIG. 14), which form first and second channels 1300, 1302 (FIG. 13). Additionally, a third pin 1404 extends into mounting shaft 1202 in a transverse direction (from the top side in FIG. 14) and a fourth pin 1406 extends into mounting shaft 1202 from an opposite transverse direction (from the bottom side in FIG. 14), which form transverse opening 1212. As mentioned above, pins 1400-1406 are tapered (at a draft angle) to enable removal of pins 1400-1406 after the driver mold hardens. As such, the resulting openings or channels in mounting shaft 1202 are tapered or angled. Pins 1400-1406 may have any shaped cross-section (e.g., a conical cross-section, a square shaped cross-section, etc.) to produce an opening that matches the corresponding motor output shaft.

Figure 15:
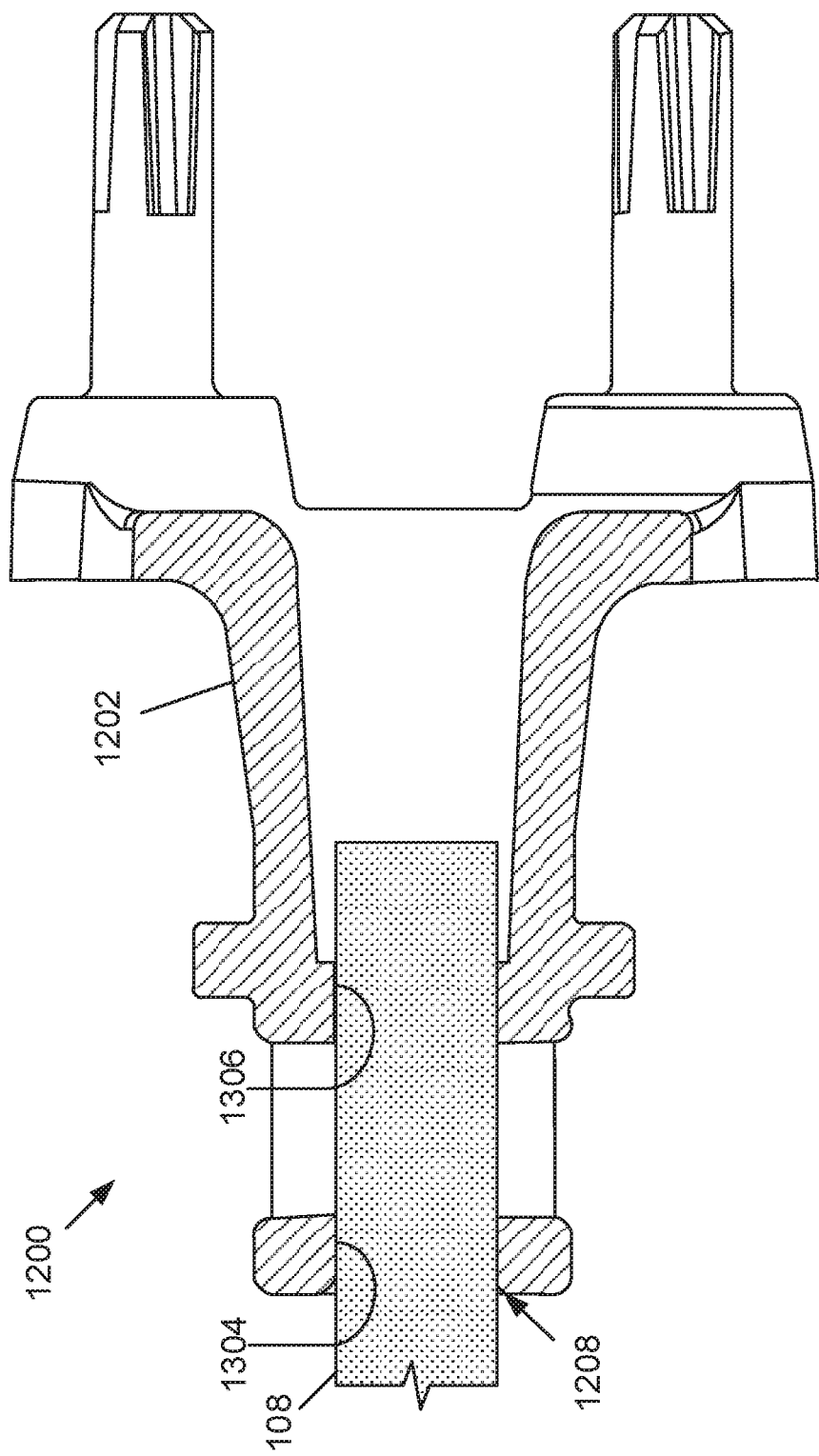
FIG. 15 illustrates the example of the driver of FIG. 13 showing a motor output shaft inserted into an opening formed in the example of the driver using the pin arrangement of FIG. 14.

FIG. 15 illustrates motor output shaft 108 inserted into opening 1208 of mounting shaft 1202. First and second contact locations 1304, 1306 are the smallest diameter portions of opening 1208 formed by first and second pins 1400, 1402 (FIG. 14) during the die casting process. These contact locations 1304, 1306 are spaced apart from each other (on opposite sides of transverse opening 1212). In other words, use of pins 1404, 1406 creates the two spaced apart contact locations 1304, 1306. The contact locations 1304, 1306 are configured to engage motor output shaft 108 at two spaced apart locations (e.g., near two opposite ends of motor output shaft 108). As a result, driver 1200 remains substantially aligned with and secured on motor output shaft 108, as compared to a driver with a single tapered opening having only one contact point, which results in reduced vibrations and, thus, less potential noise from vibrations. As disclosed above, in some aspects of this disclosure, mounting shaft 1202 may be coupled to motor output shaft 108 via an interference fit. Further, using the four pin configuration results in a longer opening (with spaced apart contact points) that enables motor output shaft 108 to penetrate deeper into driver 1200, thereby providing better contact and alignment to reduce potential vibrations between driver 1200 and motor output shaft 108. Thus, this configuration results in better tolerances, less rattling and/or vibrations and, thus, less potential noise from vibrations. Also, with the four pin configuration, first and second pins 1400, 1402 can have relatively larger draft angles, which is not as readily achievable with a single pin. In some instance, having larger draft angles facilitates removal of the pins. Further, in some instance, transverse opening 1212 may be used when assembly driver 1200 on a motor output shaft to verify and ensure the motor output shaft is inserted properly into opening 1208. For example, a manufacturing personnel may look into transverse opening 1212 when sliding driver 1200 onto a motor output shaft to ensure the motor output shaft is inserted properly into opening 1208. Further, with the four pin configuration, the dimension(s) (e.g., lengths and widths) of pins 1400-1406 can be changed to create longer or shorter openings for accommodating different length motor output shafts.

In other aspects of this disclose, a driver, such as driver 200 (FIG. 2) or driver 1200 (FIG. 12) may be die cast using a pin that extends all the way through the drive to create an opening for the motor output shaft. In some such examples, a pin with a relatively small draft angle (if any) may be used to produce a relative straight opening. In still other aspects of this disclosure, a driver, such as driver 200 (FIG. 2) or driver 1200 (FIG. 12), may be die cast without an opening for the motor output shaft. Instead, the mounting shaft may be molded as a substantially solid part or component. Then, a secondary process, such as drilling and broaching, may be used to form the opening through the mounting shaft. In such an example, a substantially straight opening may be formed in the mounting shaft that can maintain sufficient contact with the motor output shaft to remain aligned and secured to motor output shaft.

As disclosed above, in other aspects of this disclosure, example drive couplings may be used between motors and rotating members having other configurations where the motor is not concentric with the rotating member, such as a motor and a lift rod that are configured or arranged in line or end-to-end. For example, an example drive coupling may be used to couple an output shaft of a motor to a rotating member, such as a lift rod, that is axially aligned (or substantially axially aligned) with the output shaft of the motor. The example drive coupling may be used reduce potentially noise that would otherwise be generated by the connection between the motor and the rotating member.

Figure 16:
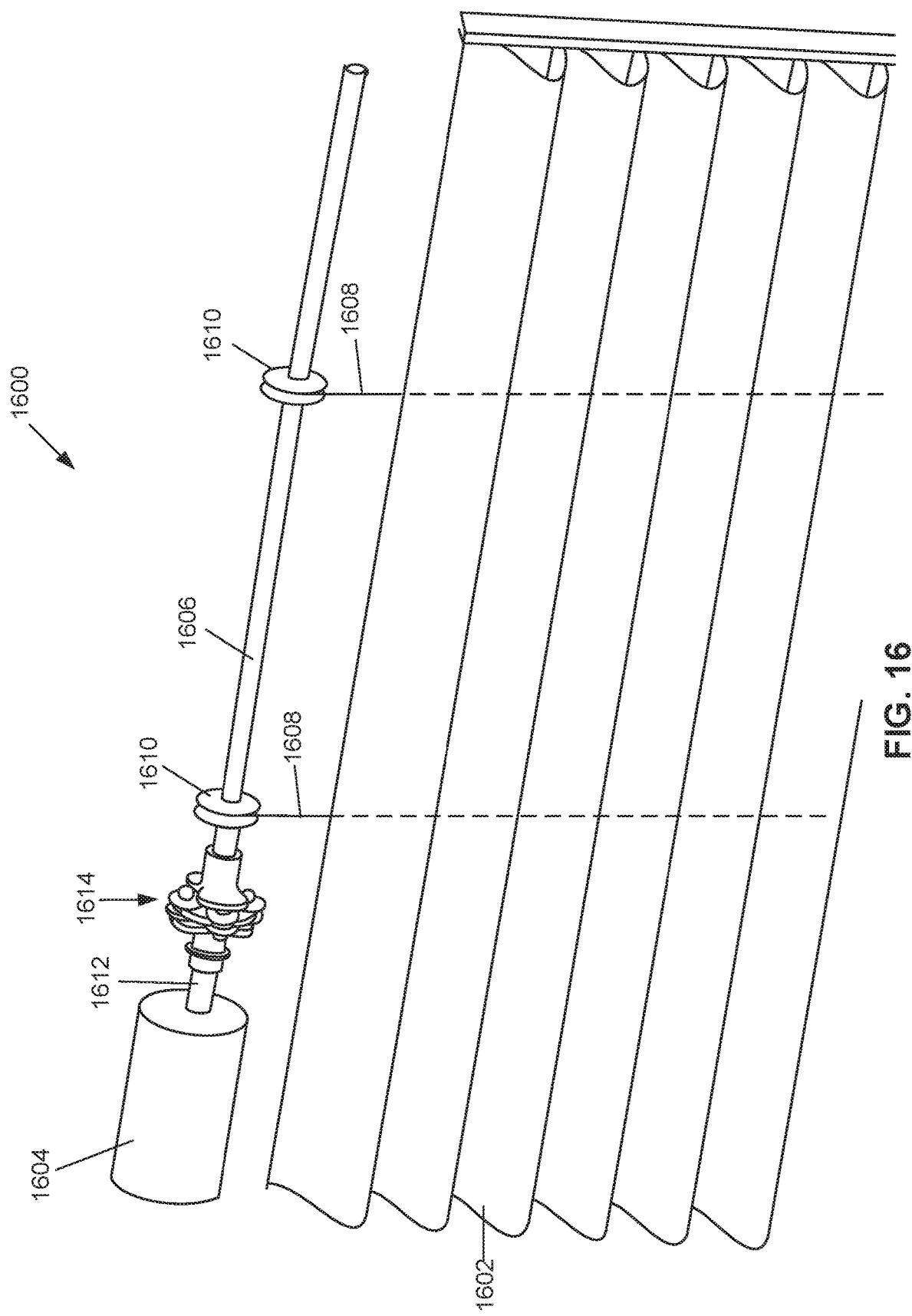
FIG. 16 is a perspective view of an example of an architectural covering employing another example of a drive coupling constructed in accordance with one or more principles of this disclosure.

For example, FIG. 16 illustrates another example of an architectural covering 1600 having a covering 1602. Similar to architectural covering 100 disclosed above, architectural covering 1600 may be used to cover an architectural structure, such as a wall, and/or an architectural opening, such as a window, a door, a sky light, an archway, etc. In the illustrated example of FIG. 16, architectural covering 1600 includes a motor 1604 and a rotating member, implemented as a lift rod 1606. In other examples, other types of rotating members may be implemented. For the sake of convenience, the example of the architectural covering 1600 is described in connection with lift rod 1606. However, it is understood that lift rod 1606 is non-limiting, and other types of rotating members may be used in addition to or as an alternative to lift rod 1606. Lift rod 1606 may be rotated to wind or unwind one or more lift cords 1608 to extend or retract covering 1602. In particular, each lift cord 1608 is coupled to a respective spool 1610 (e.g., a reel). When lift rod 1606 is rotated in one direction, lift cords 1608 are wrapped around spools 1610, which causes cover 1602 to retract (e.g., raise or otherwise uncover an architectural structure and/or opening), and when lift rod 1606 is rotated in the opposite direction, lift cords 1608 are unwound from spools 1610, which causes cover 1602 to extend (e.g., lower or otherwise cover the architectural structure and/or opening). Motor 1604 operates to rotate lift rod 1606 in one direction or the other direction depending on the desired operation. Motor 1604 has a motor output shaft 1612. Similar to motor 104 of FIG. 1, motor 1604 may be powered by any combination of internal and/or external power line connections, power from a wall outlet, battery(ies), fuel cells, solar panels, wind powered generators, and/or any other power source.

In accordance with one aspect of this disclosure, an example drive coupling 1614 is used to transfer rotational motion from motor output shaft 1612 to a rotating member, such as lift rod 1606. Drive coupling 1614 greatly reduces noise that would otherwise be generated by the connection between motor 1604 and lift rod 1606. In particular, drive coupling 1614 is coupled to and rotates with motor output shaft 1612. Additionally, drive coupling 1614 is coupled to lift rod 1606. As such, when motor 1604 rotates motor output shaft 1612, drive coupling 1614 transfers the rotational motion to lift rod 1606. As illustrated in FIG. 16, lift rod 1606 is substantially axially aligned with motor output shaft 1612 and, thus, drive coupling 1614 transfers rotational motion from motor output shaft 1612, upstream of drive coupling 1614, to lift rod 1606, downstream of drive coupling 1614.

In accordance with one aspect of this disclosure, the drive coupling includes one or more vibration-absorbers that are used to reduce vibration between the parts of the architectural covering. For example, the drive coupling may include a driver, referred to as a first driver, that connects to the output shaft of the motor and a driven member, referred to a second driver, that connects to the lift rod. The first driver rotates the second driver to rotate the lift rod. In accordance with one aspect of this disclosure, vibration-absorbers are utilized between the first driver and the second driver to reduce vibration and, thus, reduce potential noise in the architectural covering. For example, the first driver may include a first set of mounting structures, such as posts, extending outwardly from a plate in a direction that is parallel to and offset from a rotational axis of the first driver, and the second driver may include a second set of mounting structures, such as posts, extending outwardly from another plate in a direction that is parallel to and offset from a rotational axis of the second driver. In accordance with some aspects of the disclosure, the first and second drivers are positioned such that the first set of posts extend toward the second driver and the second set of posts extend toward the first driver. To transfer rotational motion from the first set of posts to the second set of posts, the drive coupling includes an intermediate structure, such as a hub, coupled with a plurality of vibration-absorbers. In accordance with one aspect of the disclosure, the hub is disposed between the first set of posts and the second set of posts. As the first driver rotates, the first set of posts rotate the hub via the vibration-absorbers and, thus, rotate the second set of posts with the vibration-absorbers and, thus, rotate the second driver. In accordance with one aspect of the disclosure, the vibration-absorbers are located between the posts and the hub. As such, the second driver is operatively engaged with the vibration-absorbers on the posts of the first driver (e.g., via the vibration-absorbers on the posts of the second driver and the hub). In accordance with some aspects of the disclosure, the second driver may be positioned such that the second set of posts extend in the same direction as the first set of posts of the first driver. In such an example, the second driver may include a central mounting shaft that extends through a central opening the hub and couples to the lift rod. In accordance with one aspect of the disclosure, the vibration-absorbers may be embodied as elastic rings. For example, an elastic ring may be disposed on each post, and the hub is engaged by the elastic rings. Thus, the second driver is indirectly coupled to the first driver by the elastic rings (and the hub). In one aspect of the disclosure, the elastic rings are implemented as grommets. The interface between the first driver, the vibration-absorbers, the hub, and the second driver results in decreased vibration, which greatly reduces and/or eliminates noise that would otherwise be generated by a traditional connection.

Figure 17:
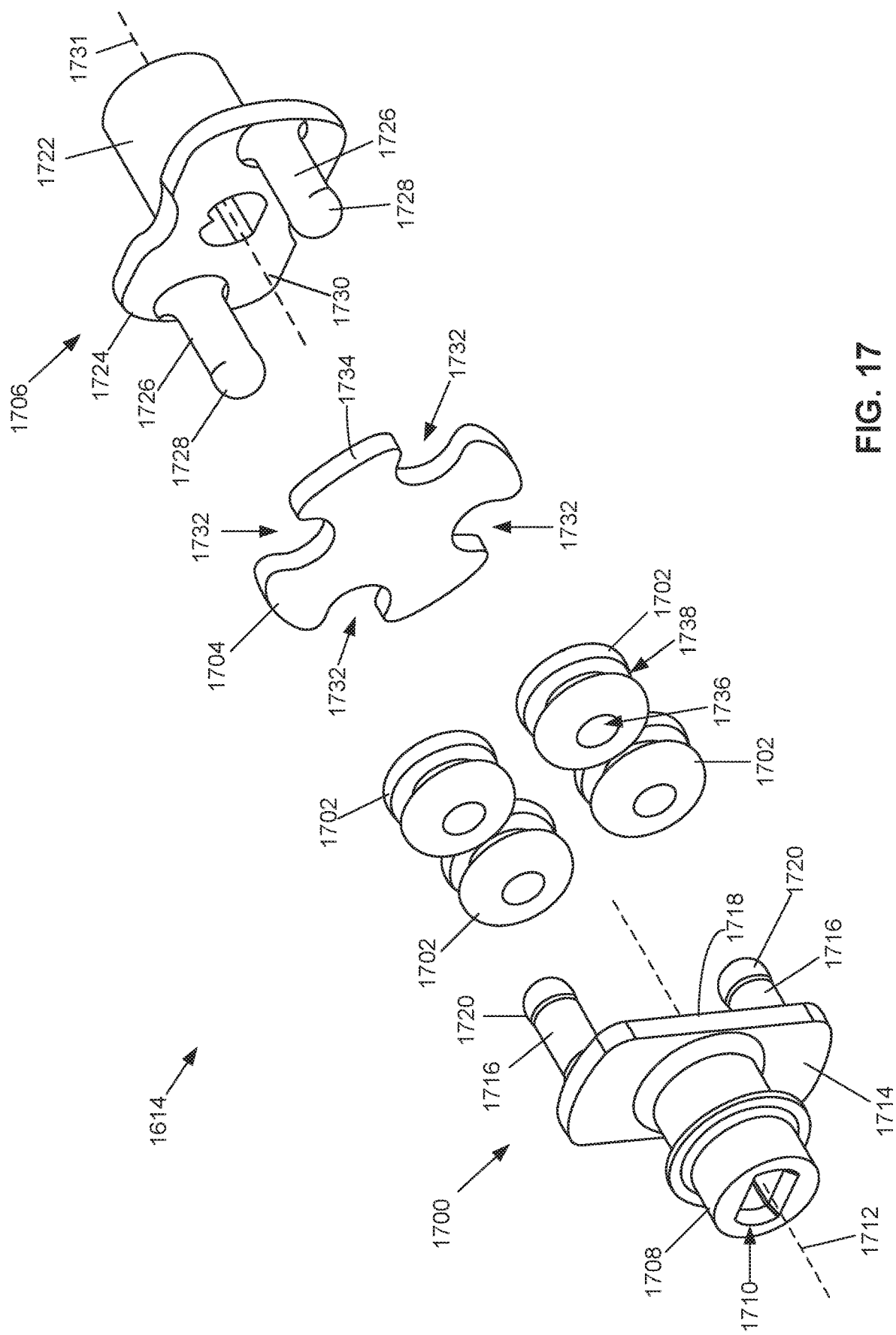
FIG. 17 is an exploded view of the example of the drive coupling of FIG. 16.

For example, FIG. 17 is an exploded view of an example of an embodiment of a drive coupling. In the illustrated example, drive coupling 1614 includes a driver 1700, referred to as first driver 1700, a set of elastic rings 1702, a hub 1704, and a second driver 1706 (e.g., a driven member, a lift cord interface). First driver 1700 includes a mounting shaft 1708 that is configured to be coupled to motor output shaft 1712 of motor 1604 (FIG. 16). In one aspect of this disclosure, mounting shaft 1708 includes an opening 1710 to receive motor output shaft 1612. In one aspect of the disclosure, first driver 1700 is coupled to motor output shaft 1712 via an interference fit. In another aspect of the disclosure, first driver 1700 is coupled to motor output shaft 1612 via a set screw (a screw extending through mounting shaft 1708 into motor output shaft 1612). Additionally or alternatively, in another aspect of the disclosure, other chemical and/or mechanical fasteners may be used to couple first driver 1700 and motor output shaft 1612. When coupled to motor output shaft 1612, motor 1604 rotates first driver 1700 about a first rotational axis 1712 (e.g., a central or longitudinal axis of first driver 1700). In one aspect of this disclosure, first rotational axis 1712 is substantially aligned with the rotational axis of motor output shaft 1612 of motor 1604.

In the illustrated example of FIG. 17, first driver 1700 includes a plate 1714 coupled to mounting shaft 1708. Plate 1714 is oriented perpendicular to first rotational axis 1712. First driver 1700 includes a set of posts 1716 that are coupled to and extend from a face 1718 of plate 1714. In other aspects of this disclosure, first driver 1700 may include more (e.g., three, four, etc.) or fewer (e.g., one) posts. Posts 1716 are parallel to and offset from first rotational axis 1712. Each post 1716 may include a ball or nub 1720 at the distal end of the respective post 1716 to restrict the respective elastic rings 1702 from sliding off, as disclosed in further detail herein. In one aspect of this disclosure, first driver 1700 is constructed as a substantially unitary part or component. For example, first driver 1700 may be molded as a single part or component and/or machined from a single piece of material. In another aspect of this disclosure, first driver 1700 may be constructed of multiple parts or components that are coupled together (e.g., posts 1716 may be welded to plate 1714, plate 1714 may be welded to mounting shaft 1708, etc.).

In the illustrated example, second driver 1706 includes a mounting shaft 1722 that is configured to be coupled to an end of a rotating member such as lift rod 1606 (FIG. 16). In one aspect of this disclosure, second driver 1706 includes an opening to receive lift rod 1606, as disclosed in further detail in connection with FIG. 20. Similar to first driver 1700, second driver 1706 includes a plate 1724 and a second set of posts 1726 with nubs 1728 extending from a face 1730 of plate 1724. Second driver 1706 is rotatable about a second rotational axis 1731, which is substantially aligned with the rotational axis of lift rod 1606. In one aspect of the disclosure, second rotational axis 1731 is substantially aligned with first rotational axis 1712. In other aspects of this disclosure, as discussed in further detail in connection with FIGS. 21A and 21B, second rotational axis 1731 may not be aligned with first rotational axis 1712.

To transfer rotational motion between first driver 1700 and second driver 1706, hub 1704 is disposed between first driver 1700 and second driver 1706. In the illustrated example, hub 1704 is a plate having four notches 1732 in an outer edge 1734 of hub 1704. When drive coupling 1614 is assembled, hub 1704 is disposed between posts 1716 of first driver 1700 and posts 1726 of second driver 1706. Therefore, first driver 1700 rotates hub 1704, which rotates second driver 1706 to transfer rotational motion to lift rod 1606 (FIG. 16).

Similar to drive coupling 110 disclosed in connection with FIGS. 1-8, one or more parts for absorbing vibration are included in drive coupling 1614 to dampen potential vibration and, thus, reduce potential noise. The vibration-absorber(s) may be constructed of a lower durometer material (e.g., Shore A material such as nitrile rubber). The vibration-absorber(s) may be interposed in one or more locations between the relatively harder part(s) of drive coupling 1614. For example, referring to FIG. 17, drive coupling 1614 includes elastic rings 1702. In the illustrated example, elastic rings 1702 are implemented as grommets. Each elastic ring 1702 includes an opening 1736 (one of which is reference in FIG. 17) and a groove 1738 (one of which is referenced in FIG. 17) formed around an outer edge of the respective elastic ring 1702. Elastic rings 1702 may be substantially the same as elastic rings 202 disclosed in detail above in connection with FIG. 2. Thus, to avoid redundancy, a description of the type of materials, the function, and the sizes of the elastic rings 1702 is not repeated here. Instead, the interested reader is referred back to the discussion of FIGS. 2-8 for a full written description of the elastic rings.

Figure 18:
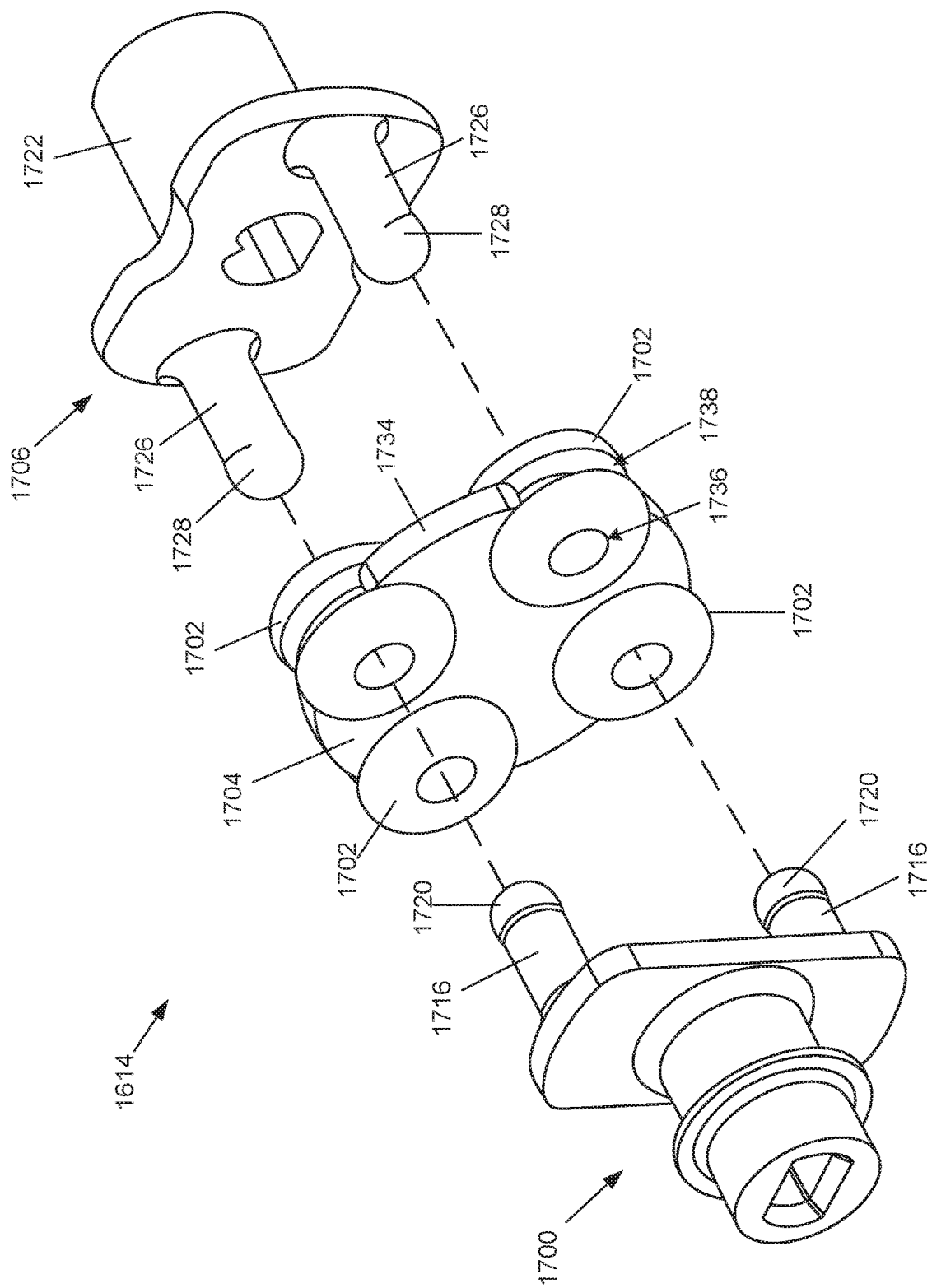
FIG. 18 is a perspective view of the example of the drive coupling of FIG. 16 in a partially assembled state.

As illustrated in FIG. 18, elastic rings 1702 are configured to be inserted into notches 1732 (FIG. 17) of hub 174. As such, outer edge 1734 of hub 1704 extends into grooves 1738 (one of which is referenced in FIG. 18) of each elastic ring 1702. Further, generally one elastic ring 1702 is to be coupled to each of posts 1716 of first driver 1700 and posts 1726 of second driver 1706. In particular, posts 1716, 1726 are to be inserted into openings 1736 (one of which is referenced in FIG. 18) of the respective elastic rings 1702. Thus, second driver 1706 is operatively engaged with the elastic rings 1702 on posts 1716 of the first driver 1700 (via elastic rings 1702 on posts 1726 of second driver 1706 and hub 1704). Nubs 1720, 1728 have a larger diameter than openings 1736 of elastic rings 1702. As a result, once elastic rings 1702 are on posts 1716, 1726, nubs 1720, 1728 help to maintain elastic rings 1702 on posts 1716, 1726, unless a sufficient force is applied in the axial direction to pull the corresponding nub 1720, 1728 through opening 1736 of the corresponding elastic ring 1702. An example process of assembling drive coupling 1714 may include inserting posts 1716, 1726 into elastic rings 1702 (i.e., placing elastic rings 1702 on posts 1716, 1726), and then placing hub 1704 between posts 1716, 1726 such that elastic rings 1702 are inserted into notches 1732 of hub 1704. Another example assembly process may include inserting elastic rings 1702 into notches 1732 of hub 1704 first (as shown in FIG. 18), and then inserting posts 1716, 1726 into elastic rings 1702.

In accordance with one aspect of this disclosure, the clearance between the inner diameter of openings 1736 and a diameter of respective posts 1716, 1726 may be about 0.005 in (0.127 mm) (e.g., ±0.003 in (0.076 mm)), similar to the clearance disclosed above in connection with elastic rings 202 and posts 214 of FIG. 2. For example, the inner diameter may be about 0.125 in (3.175 mm) and the diameter of posts 1716, 1726 may be about 0.119 in (3.023 mm)±0.003 in (0.076 mm). In some instances, this clearance results in the most noise reduction while still enabling easy assembly of elastic rings 1702 on posts 1716, 1726. In other aspects of this disclosure, the inner diameter of elastic rings 1702 and/or the diameter of the respective posts 1716, 1726 may be larger or smaller. In one aspect of this disclosure, the clearance or difference between the width of groove 1738 and a width of hub 1704 is about 0.005 in (0.127 mm) (e.g., ±0.003 in (0.076 mm)). For example, the width of groove 1738 may be about 0.0625 in (1.5875 mm) and the width of hub 1704 may be about 0.087 in (2.21 mm) (e.g., ±0.003 in (0.076 mm)). In some instances, this clearance results in minimal noise caused from vibration between the parts and components of the architectural covering 1600. In other aspects of this disclosure, the dimensions of the width of groove 1738 and/or the width of hub 1704 may be larger or smaller.

In the illustrated example, first driver 1700 includes two posts 1716 and second driver 1706 includes two posts 1726. In other aspects of this disclosure, first driver 1700 and/or second driver 1706 may include more or fewer posts. For example, first driver 1700 and second driver 1706 may each include three posts. In such an example, hub 1704 may include six notches, and elastic rings may be disposed on each of the posts between the respective post and hub 1704.

Figure 19:
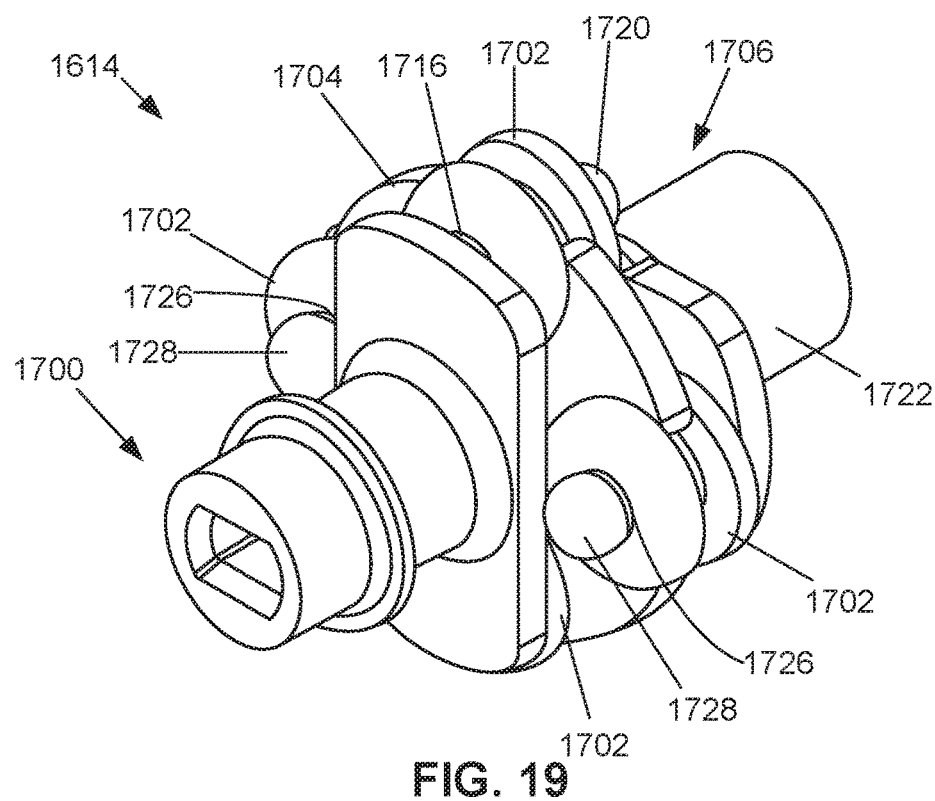
FIG. 19 is a perspective view of the example of the drive coupling of FIG. 16 in an assembled state.
Figure 20:
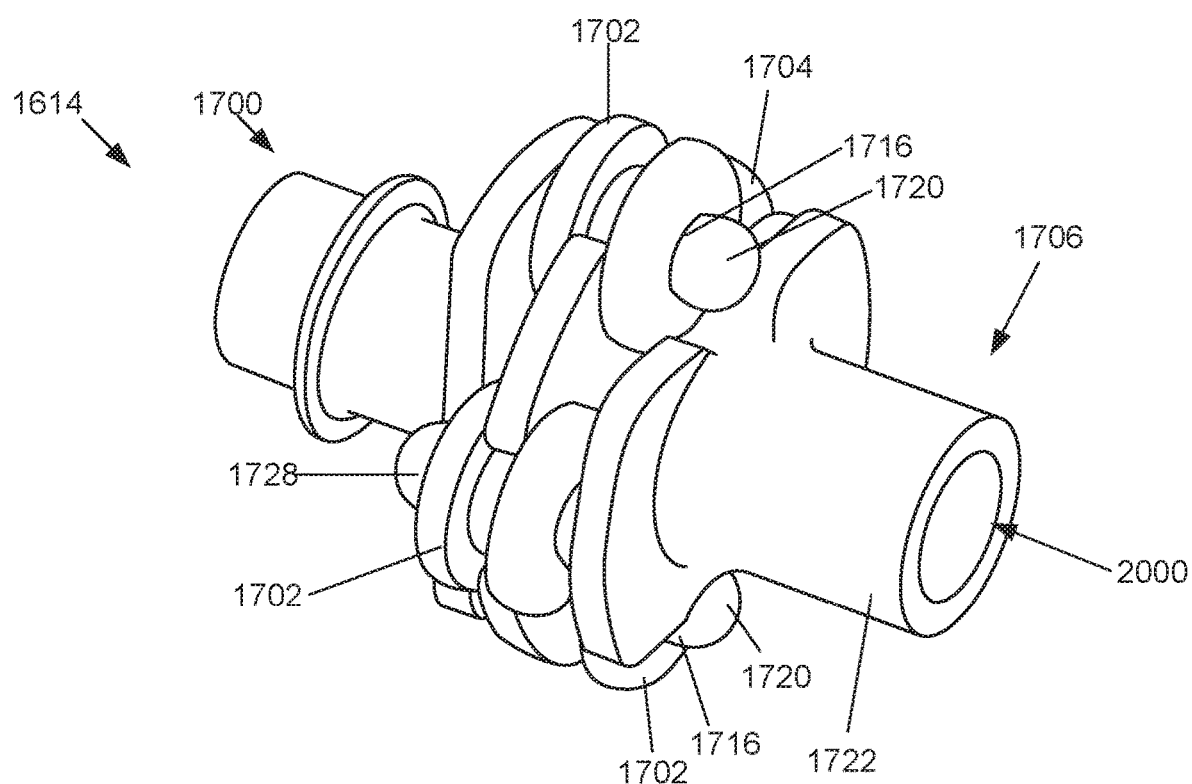
FIG. 20 is another perspective view of the example of the drive coupling of FIG. 16 in an assembled state.

Assembled views of drive coupling 1614 are illustrated in FIGS. 19 and 20. In the assembled state, posts 1716 of first driver 1700 extend outwardly beyond hub 1704 toward second driver 1706, and posts 1726 of second driver 1706 extend outwardly beyond hub 1704 toward first driver 1700 (e.g., in the opposite direction). As a result, hub 1704 is disposed between posts 1716, 1726 and, thus, between first driver 1700 and second driver 1706. In the assembled state, elastic rings 1702 are disposed along a common plane. In some aspects of this disclosure, nubs 1720, 1728 on posts 1716, 1726 prevent elastic rings 1702 and, thus, hub 1704 from being removed from posts 1716, 1726 (unless a sufficient force is applied in either direction to pull the corresponding nub 1720, 1728 through opening 1736 of the corresponding elastic ring 1702). In other aspects of this disclosure, no nubs may be used.

As illustrated in FIGS. 19 and 20, elastic rings 1702 are interposed between first driver 1700 and hub 1704, and between hub 1704 and second driver 1706, which reduces or eliminates contact between first driver 1700, hub 1704, and second driver 1706. Elastic rings 1702 absorb vibration that may otherwise cause acoustic waves (e.g., sound) between first driver 1700 (e.g., the driving member) and second driver 1706 (e.g., the driven member). In the illustrated example of FIG. 20, mounting shaft 1722 of second driver 1706 includes an opening 2000 to receive lift rod 1606 (FIG. 16). In one aspect of the disclosure, second driver 1706 is coupled to lift rod 1606 via interference fit. Additionally or alternatively, in another aspect of the disclosure, other chemical and/or mechanical fasteners may be used to couple second driver 1706 and lift rod 1606.

In some aspects of this disclosure, the drive coupling may be used to enable transfer of rotational motion even if the output shaft of the motor and rotating member (e.g., a lift rod) are misaligned. For example, as illustrated in FIG. 21A, if second driver 1706 is angled with respect to hub 1704 and and/or to first driver 1700, desired operation and transference of rotation are not impeded with the desired noise reduction of other embodiments disclosed herein. In the illustrated example of FIG. 21A, second driver 1706 has been rotated or tilted about an axis extending into the figure through posts 1726. In particular, second driver 1706 is angled with respect to hub 1704 (at angle α) angled with respect to first driver 1700 (at angle θ). Elastic rings 1702 (one of which is referenced in FIG. 21) compress or deform to enable posts 1726 of second driver 1706 to tilt with respective to openings 1736 (FIG. 17) of elastic rings 1702 and, thus, with respect to hub 1704 and/or first driver 1700. As such, second rotational axis 1731 of second driver 1706 (and, thus, lift rod 1606 (FIG. 16)) is not aligned with rotational axis 1712 of first driver 1700, but the desired transference of rotational motion is still achieved.

While second driver 1706 is illustrated as tilted about an axis (e.g., a first degree of freedom) extending into the figure through posts 1726 in FIG. 21, second driver 1706 may additionally or alternatively be tilted about another axis (e.g., a second degree of freedom) as illustrated in FIG. 21. FIG. 21 illustrates drive coupling 1614 rotated 90° about first rotational axis 1712, as compared to FIG. 21, and without second driver 1706 being tilted about the axis in FIG. 21. In FIG. 21, second driver 1706 is angled with respect to first driver 1700 about an axis that extends into the figure through posts 1716 and is perpendicular to the axis about which second driver 1706 is tilted in FIG. 21A. In the illustrated example of FIG. 21B, hub 1704 is angled with respect to first driver 1700 (at angle β), and second driver 1706 is angled with respect to first driver 1700 (at angle φ). Elastic rings 1702 (one of which is referenced in FIG. 21B) compress or deform to enable posts 1716 of first driver 1700 to tilt with respective to openings 1736 (FIG. 17) of elastic rings 1702. Therefore, second rotational axis 1731 of second driver 1706 (and, thus, the rotating member (such as lift rod 1606 (FIG. 16))) is not aligned with first rotational axis 1712 of first driver 1700. Thus, second driver 1706 may be rotated or tilted about one or both of these axes (or vice versa). In other words, first and second drivers 1700, 1706 are movable about two degrees of freedom relative to each other, which enables first rotational axis 1712 and second rotational axis 1731 to remain in relatively fixed directions while first and second drivers 1700, 1706 rotate. As such, drive coupling 1614 enables motor output shaft 1612 (FIG. 16) to transfer rotational motion to the rotating member even if motor output shaft 1612 and the rotating member are not axially aligned.

Figure 22A:
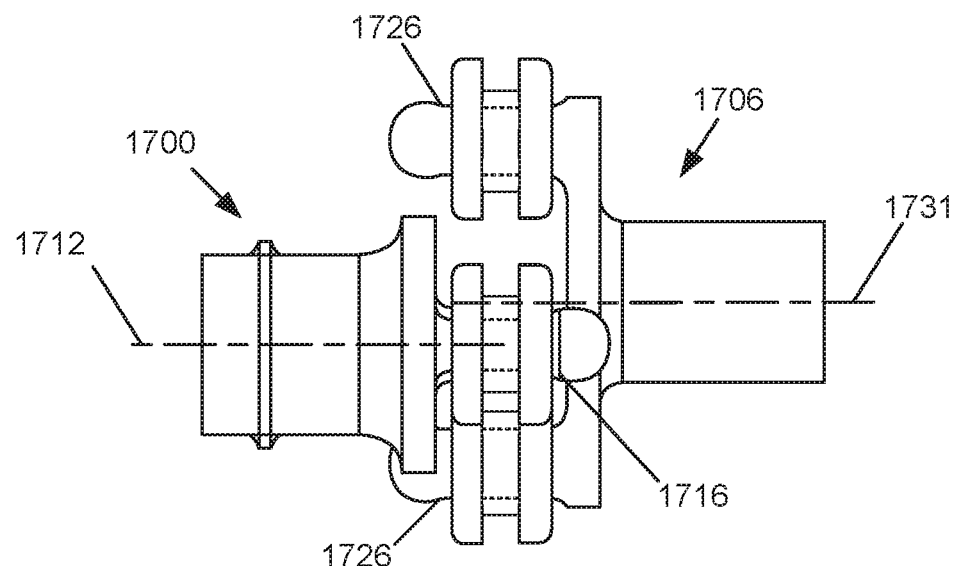
FIG. 22A is a side view of the example of the drive coupling of FIG. 16 in which a second driver of the drive coupling is misaligned with a first driver of the drive coupling.
Figure 22B:
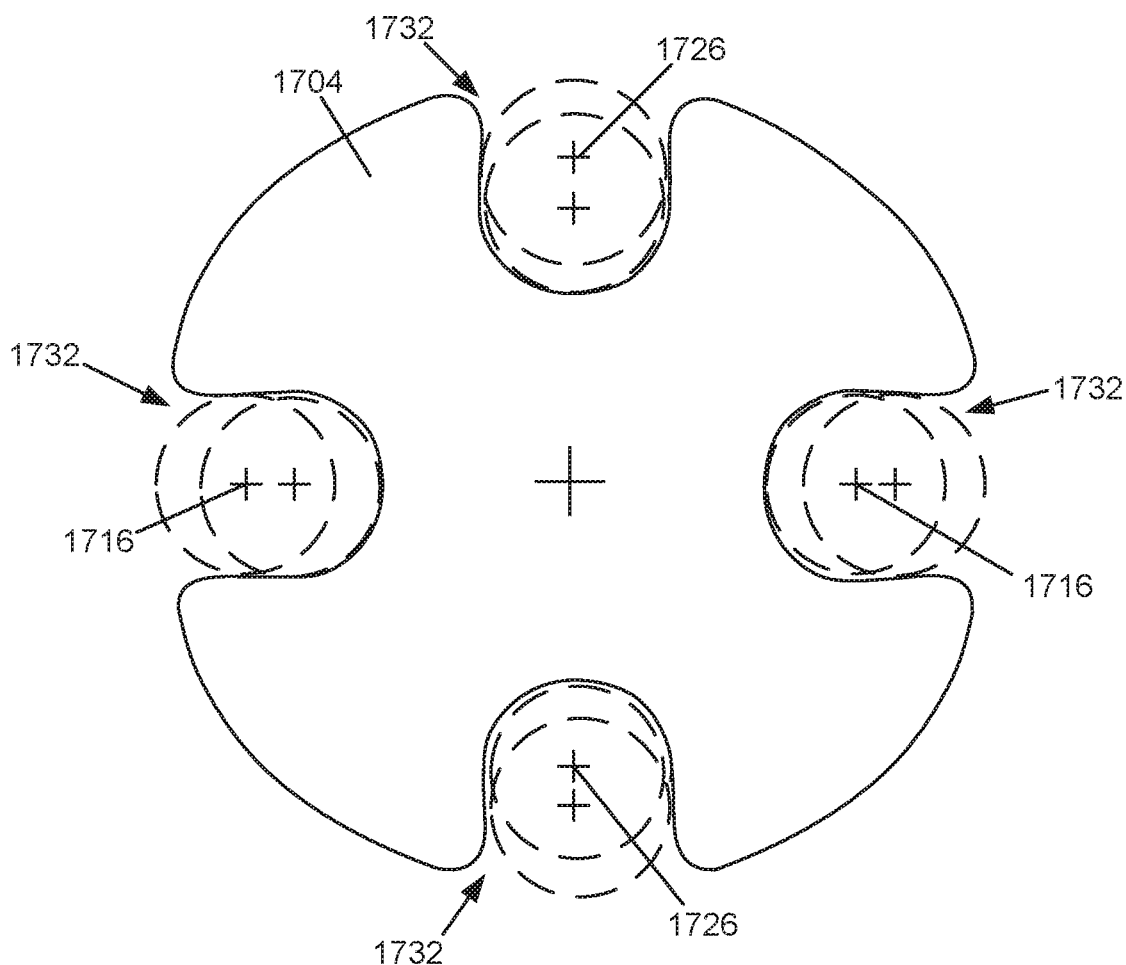
FIG. 22B is a plan view of a hub of the drive coupling of FIG. 22A showing movement of posts of the first and second drivers.

Further, in some aspects of the disclosure, the drive coupling may be used to enable transfer of rotational motion if the output shaft of the motor and the rotating member (e.g., a lift rod) are parallel to but offset from each other. For example, as illustrated in FIG. 22A, second driver 1706 has been moved relative to first driver 1700 such that rotational axis 1712 of first driver 1700 and rotational axis 1731 of second driver 1706 are parallel to but offset from each other. In other words, first driver 1700 and/or second driver 1706 can be shifted out of axial alignment (e.g., sideways) and still transfer rotational motion, which enables motor output shaft 1612 (FIG. 16) to transfer rotational motion to the rotating member even if motor output shaft 1612 and the rotating member are not axially aligned. In FIG. 22A, hub 1704 has been removed for clarity. FIG. 22B shows a plan view of the hub 1704. As illustrated, posts 1716, 1726 (represented by crosses) of first and second drivers 1700, 1706 (FIG. 22A) and the associated elastic rings (shown in dashed lines) can move within the respective notches 1732 in hub 1704, thereby enabling hub 1704 to shift (up, down, left, or right in FIG. 22B). For example, if first driver 1700 is moved upward in FIG. 22B, posts 1716 of first driver 1700 move hub 1704 upward, which causes posts 1726 of second driver 1706 to shift in the respective notches 1732. Likewise, if second driver 1706 is moved left in FIG. 22B, for example, posts 1726 of second driver 1706 move hub 1704 left, which causes posts 1716 of first driver 1700 to shift in the respective notches. Thus, the rotational axes of first and second driver 1700, 1706 (and, thus, motor output shaft 1612 and the rotating member) may be offset from each other. In some aspects of this disclosure, posts 1716, 1726 (and, thus, the associated elastic rings) can shift about 0.020 inches in the respective notches 1732. In others aspects of this disclosure, posts 1716, 1726 can shift more or less. For example, notches 1732 may be slotted longer or shorter to enable different amounts of travel.

While in drive coupling 1614 of FIGS. 16-22B first driver 1700 and second driver 1706 are on opposite sides of hub 1704 (e.g., in an opposing arrangement), in other aspects of this disclosure, a drive coupling may include two drivers that are disposed on the same side of a hub. For example, FIGS. 23A and 23B illustrate another example drive coupling 2300 that may be used with an architectural covering, such as architectural covering 1600 (FIG. 16), to transfer rotational motion from a motor output shaft, such as motor output shaft 1612 (FIG. 16), to a rotating member, such as lift rod 1606 (FIG. 16). In some examples, the arrangement of parts of drive coupling 2300 results in a shorter assembly time. Further, as shown in the side view of FIG. 23B, drive coupling 2300 has a shorter length (between an end of mounting shaft 2310 and an end of central mounting shaft 2320) and, thus, is more compact and can be used in smaller spaces (e.g., in a smaller gap between a motor output shaft and a lift rod).

FIG. 23A illustrates an exploded view of drive coupling 2300 and FIG. 23B illustrates an assembled side view of drive coupling 2300. Drive coupling 2300 includes a driver 2302, referred to as first driver 2302, a set of elastic rings 2304, a hub 2306, and a second driver 2308 (e.g., a driven member, a lift cord interface). First driver 2302 includes a mounting shaft 2310, a plate 2312, and a first set of posts 2314 extending from plate 2312. First driver 2302, elastic rings 2304, and hub 2306 are substantially the same as first driver 1700, elastic rings 1702, and hub 1704 of drive coupling 1614 shown in FIGS. 16-22B. Thus, to avoid redundancy, a description of these structures and the associated functions are not repeated herein. Instead, the interested reader is referred back to the discussion of FIGS. 16-22B for a full written description of these structures and functions.

As illustrated in FIGS. 23A and 23B, second driver 2308 includes a plate 2316 and a second set of posts 2318 extending from plate 2316. In the illustrated example, second driver 2308 is positioned such that posts 2318 extend in a same direction as posts 2314 of first driver 2302. When assembled, as shown in FIG. 23B, plate 2316 of second driver 2308 is disposed between plate 2312 of first driver 2302 and hub 2306. Posts 2314, 2318 extend through respective ones of elastic rings 2304, which engage hub 2306, similar to drive coupling 1614 disclosed above, to dampen vibration and, thus, reduce potential noise. As shown in FIGS. 23A and 23B, second driver 2308 also includes a central mounting shaft 2320 that extends from plate 2316 of second driver 2308 in the same direction as posts 2318. When drive coupling 2300 is assembled, central mounting shaft 2320 extends through a central opening 2322 (FIG. 23A) in hub 2306. As shown in FIG. 23A, central mounting shaft 2320 includes an opening 2324 to receive a lift rod, similar to opening 2000 of second driver 1706 shown in FIG. 20. Thus, the arrangement of first driver 2302, vibration absorbers 2304, hub 2308, and second driver 2308 enables a lift rod to be rotated with a motor output shaft. In the illustrated example of FIG. 23A, opening 2324 is V-shaped to receive a corresponding V-shaped end on a lift rod. In other examples, opening 2324 may be shaped differently. In some aspects of this disclosure, central opening 2322 is larger than the diameter of central mounting shaft 2320 to enable central mounting shaft 2320 (and, thus, second driver 2308) to move laterally. As disclosed in connection with FIGS. 21A-21B, the interaction between the posts, the elastic rings, and the hub enable first and second drivers 2302, 2308 to transfer rotational motion even when misaligned. In some aspects of this disclosure, the arrangement of parts of drive coupling 2300 results in a shorter assembly time. Further, as shown in the side view of FIG. 23B, drive coupling 2300 has a shorter length (between an end of mounting shaft 2310 and an end of central mounting shaft 2320) and, thus, is more compact and can be used in smaller spaces (e.g., in a smaller gap between a motor output shaft and a lift rod). When an architectural covering, such as architectural covering 100 (FIG. 1) or architectural covering 1600 (FIG. 12), is mounted to an architectural opening (e.g., a window) and/or an architectural structure (e.g., a wall), a valance is often coupled to the outside of the architectural covering and/or to the architectural opening/structure to cover or hide the architectural covering. In some instances, the valance is coupled to the frame or structure to which the architectural covering is mounted. In other instances, the valance is coupled to or constructed as part of a headrail, which includes a bracket or mounting plate to which the architectural covering is coupled. Disclosed herein are examples of valances having a layer of sound-dampening material that help to attenuate or dampen potential noise from movement of the architectural covering. In one aspect of this disclosure, a layer of sound-dampening material is coupled to a back side of the valance, which is the side facing the architectural covering. As such, potential noise (e.g., acoustic waves) generated by the architectural covering is absorbed by the sound-dampening material and prevented from passing through the valance and into the surrounding environment. Also disclosed herein are example of methods for constructing valances and/or headrails with sound-dampening materials. In one aspect of this disclosure, a layer of sound-dampening material has an adhesive side, which is engaged with the back side of the valance. Additionally or alternatively, a clip may be provided to couple the layer of sound-dampening material to the back side of the valance. The clip and the layer of sound-dampening material may be constructed by a simultaneous extrusion process, which results in the layer of sound-dampening material being connected or fused to the clip.

Figure 24:
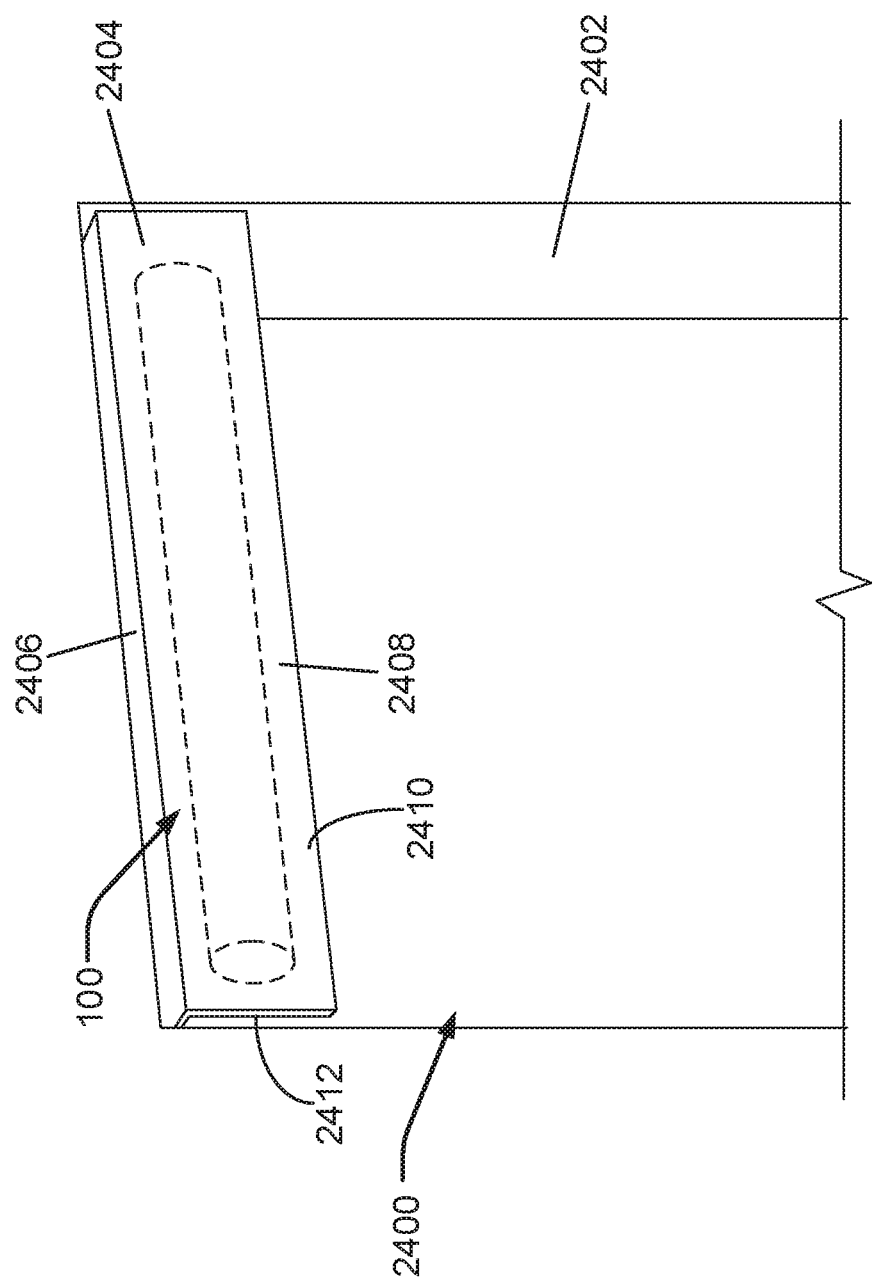
FIG. 24 illustrates an example of an architectural covering including an example of a headrail having an example of a valance with sound-dampening material constructed in accordance with one or principles of this disclosure.

For example, FIG. 24 illustrates architectural covering 100 (shown in dashed lines) disposed at a top of a window opening 2400. Window opening 2400 is defined by a frame 2402. In the illustrated example, architectural covering 100 is carried by a headrail 2404 (e.g., a bracket), which is coupled to frame 2402. Headrail 2404 may be coupled to frame 2402 via one or more mechanical fasteners, such as screw(s) and/or nail(s). In the illustrated example of FIG. 24, the headrail 2404 includes a top mounting plate 2406 and a valance 2408. Valance 2408 extends or projects downward from top mounting plate 2406 and, thus, covers and/or otherwise obstructs the view of architectural covering 100. Valance 2408 has a front side 2410, which faces outward (e.g., toward a user), and a back side 2412, which faces toward architectural covering 100.

In accordance with one aspect of this disclosure, a retainer, such as a clip, may be used to couple a layer of sound-dampening material to a back side of the valance. In one aspect of this disclosure, the layer of sound-dampening material is coupled to the clip (e.g., via an adhesive, via fusion from an extrusion process, etc.). The clip may be connected to the back side of the valance such that the layer of sound-dampening material is sandwiched between the clip and the back side of the valance. For example, the clip may have a first connector (e.g., a male connector) and the back side of the valance may have a second connector (e.g., a female connector) that mates with the first connector, and the clip may be connected to the back side of the valance by coupling the first and second connectors. In accordance with one aspect of this disclosure, the clip may block or prevent the covering from contacting the sound-dampening material as the covering is raised or lowered. In some instances, the coloring of the sound-dampening material may rub off onto the covering if the covering comes into contact with the sound-dampening material. As such, the clip protects the covering from contacting the sound-dampening material, while still enabling the valance and architectural covering to be disposed relatively close (e.g., in a compact assembly).

Figure 25A:
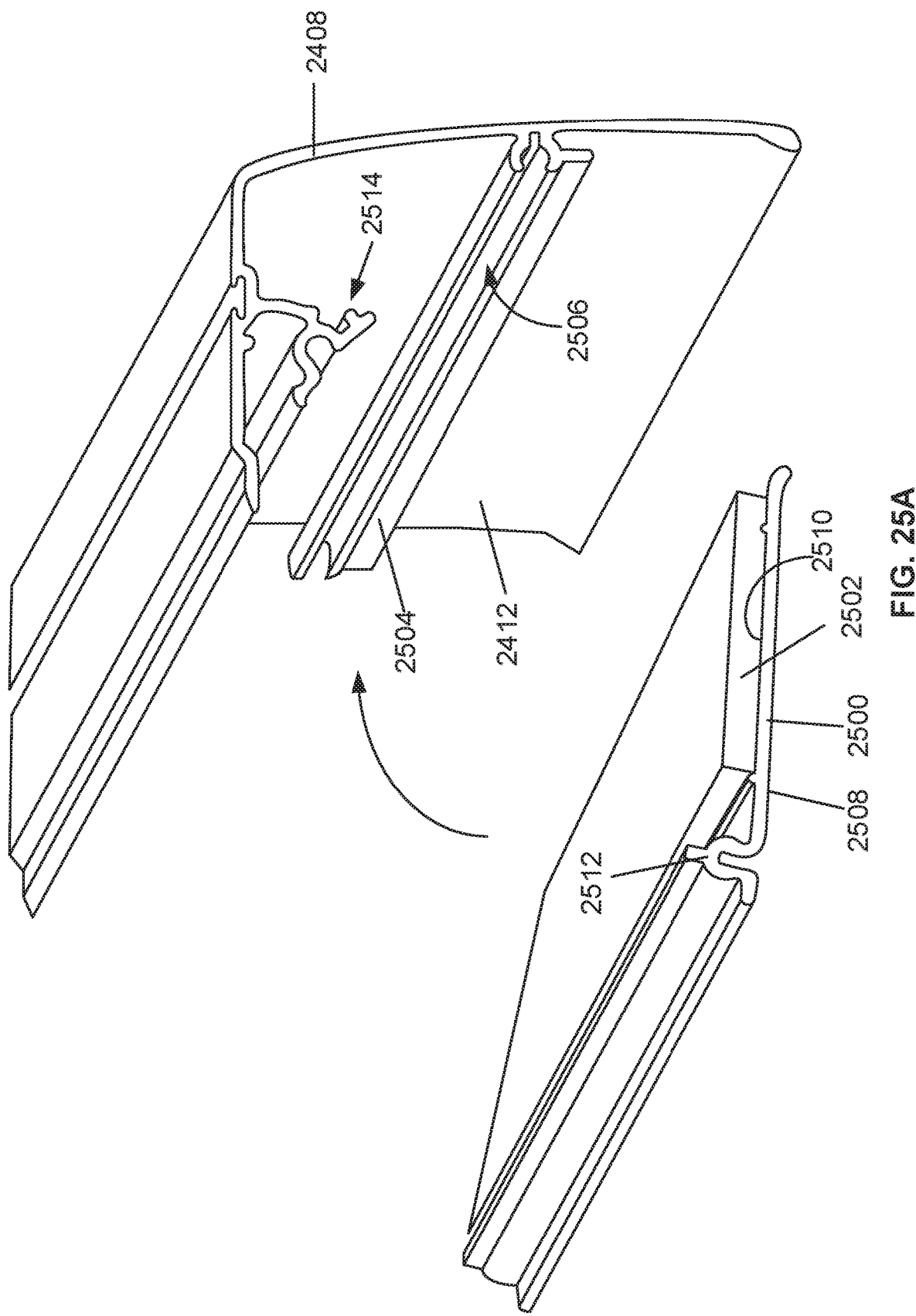
FIGS. 25A and 25B illustrate an example of a clip used to couple an example of a layer of sound-dampening material to a back side of the example of the valance of FIG. 24.
Figure 25B:
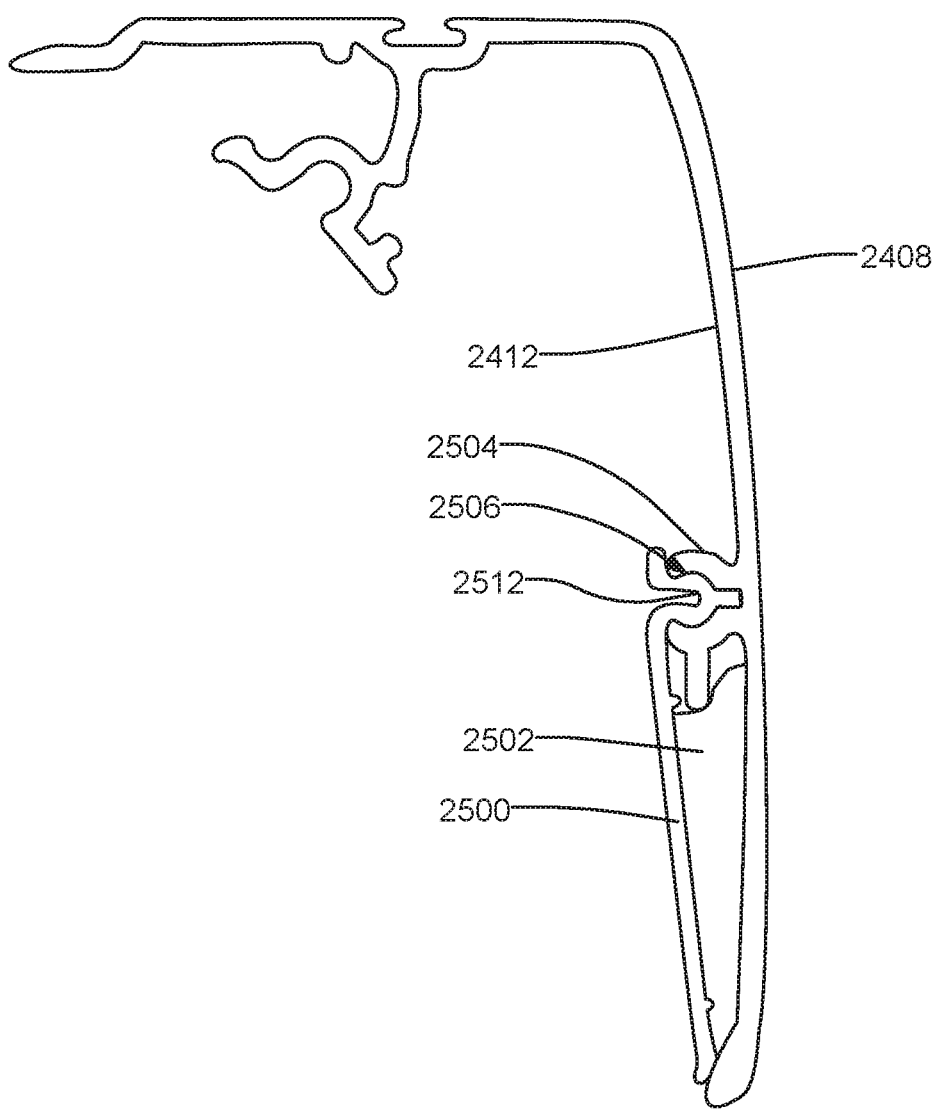

For example, FIG. 25A illustrates an example of a clip 2500 that may be used to couple a layer of sound-dampening material 2502 to back side 2412 of valance 2408. In the illustrated example, valance 2408 includes a female connector 2504 (e.g., a first connector) extending along back side 2412 of valance 2408. Female connector 2504 includes a slot 2506. Clip 2500 has a front side 2508 and a back side 2510. In the illustrated example of FIG. 25A, sound-dampening material 2502 is disposed on back side 2510 of clip 2500. In one aspect of this disclosure, sound-dampening material 2502 is coupled to back side 2510 of clip 2500 via an adhesive. In the illustrated example, clip 2500 includes a male connector 2512 (e.g., a second connector) extending along back side 2510 of clip 2500. As illustrated in FIG. 25B, male connector 2512 may be inserted into female connector 2504 to couple clip 2500 to back side 2412 of valance 2408. In one aspect of the disclosure, male connector 2512 is compressible and may be press fit into female connector 2504. For example, male connector 2512 may be squeezed or compressed, inserted into slot 2506 of female connector 2504, and then released. Once released, male connector 2512 expands inside slot 2506. Additionally or alternatively, male connector 2512 may be slid into female connector 2504 from an end of female connector 2504. When clip 2500 is coupled to valance 2408, a wedge-shaped cavity is formed, and sound-dampening material 2502 is disposed in the cavity.

In the arrangement illustrated in FIG. 25B, sound-dampening material 2502 is disposed between clip 2500 and valance 2408. Sound-dampening material 2502 attenuates the potential noise caused by movement of architectural covering 100 (FIG. 24). Architectural covering 100 may be coupled to a mounting bracket 2514 on headrail 2404, for example, shown in FIGS. 25A and 25B. In one aspect of the disclosure, sound-dampening material 2502 is a synthetic rubber such as butyl rubber (which is a copolymer of isobutylene and isoprene). Additionally or alternatively, sound-dampening material 2502 may include other types of sound-dampening materials such as, for example, styrene-butadiene rubber, acrylic rubber, natural rubber, elastomers, plastics, etc. In one aspect of the disclosure, clip 2500 is constructed of a thermoplastic resin, such as Acrylonitrile Butadiene Styrene (ABS), or vinyl. In other aspects of the disclosure, clip 2500 may be constructed of other materials. While in the illustrated example of FIGS. 25A and 25B only one layer of sound-dampening material is implemented, in other aspects of the disclosure, more than one layer of sound-dampening material may be implemented. For example, a second layer of sound-dampening material may be stacked on sound-dampening material 2502. The second layer of sound-dampening material may be the same as or different than the sound-dampening material 2502.

An example method of manufacturing headrail 2404 may include extruding clip 2500 using a first extrusion die and extruding sound-dampening material 2502 using a second extrusion die. In an extrusion process, a material (e.g., starting with pellets) is heated and pushed through a die having a desired cross-section of the part or component, which creates an elongated part having a relatively constant cross-section. For example, clip 2500 may be constructed by extruding a first material through the first extrusion die (having the cross-section of the shape of clip 2500) and sound-dampening material 2502 may be constructed by extruding a sound-dampening material through the second extrusion die (having a rectangular cross section) to form an co-extruded clip/sound-dampening component. The dies may be nozzle or slot-dies, for example. In one aspect of the disclosure, clip 2500 and sound-dampening material 2502 are extruded simultaneously and coupled to each other via the co-extrusion process (e.g., fused together). In other words, the extrusion process may be configured such that the materials exiting the respective dies are engaged. When the materials cool and harden, the materials are fused together. Then, clip 2500 may be coupled to valance 2408, as illustrated in FIG. 25B. In some aspects of this disclosure, co-extruding clip 2500 and sound-dampening material 2502 in such a manner results in a relatively simple process to form the combined clip/sound-dampening material, a relatively strong coupling between clip 2500 and sound-dampening material 2502, and/or easy ability to modify the dies and make customized shapes.

In one aspect of the disclosure, sound-dampening material 2502 has a substantially rectangular cross-section. When clip 2500 is coupled to back side 2412 of valance 2408, a wedge-shaped cavity is formed, which is substantially filled by sound-dampening material 2502. However, in other aspects of the disclosure, sound-dampening material 2502 may be extruded as another shape (e.g., a wedge).

In another aspect of the disclosure, an adhesive layer may be extruded between clip 2500 and sound-dampening material 2502, which couples sound-dampening material 2502 to clip 2500. In another aspect of this disclosure, clip 2500 and sound-dampening material 2502 may be extruded separately, and then sound-dampening material 2502 may be coupled to back side 2510 of clip 2500. Valance 2408 and/or headrail 2404 may also be formed by an extrusion process. In one aspect of the disclosure, valance 2408 and/or headrail 2404 may be constructed of aluminum. In other aspect of the disclosure, valance 2408 and/or headrail 2404 may be constructed of other materials.

Figure 26A:
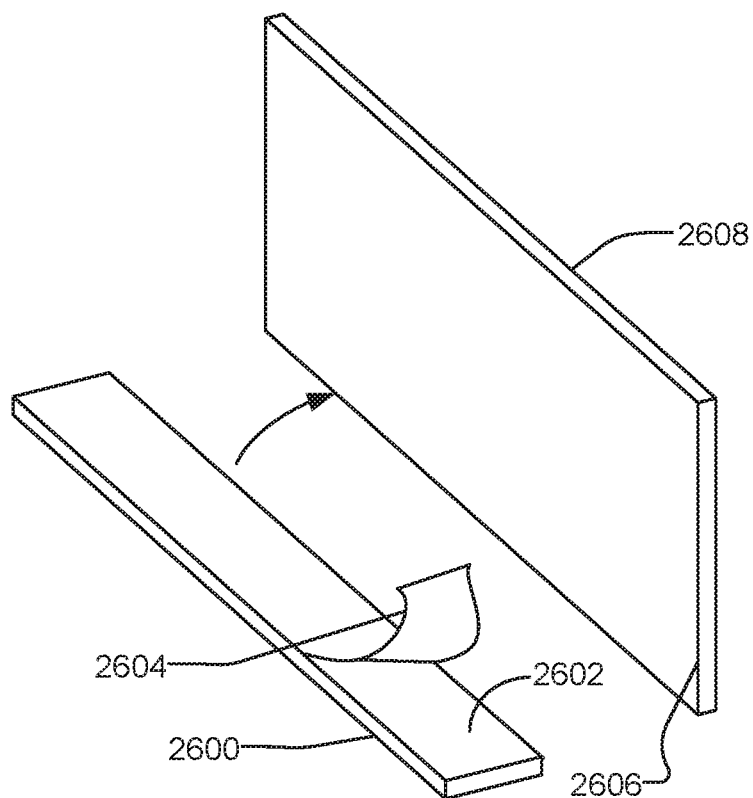
FIGS. 26A and 26B illustrate another example in which an example of a layer of sound-dampening material is coupled to a back side of an example of a valance and constructed in accordance with one or more principles of this disclosure.
Figure 26B:
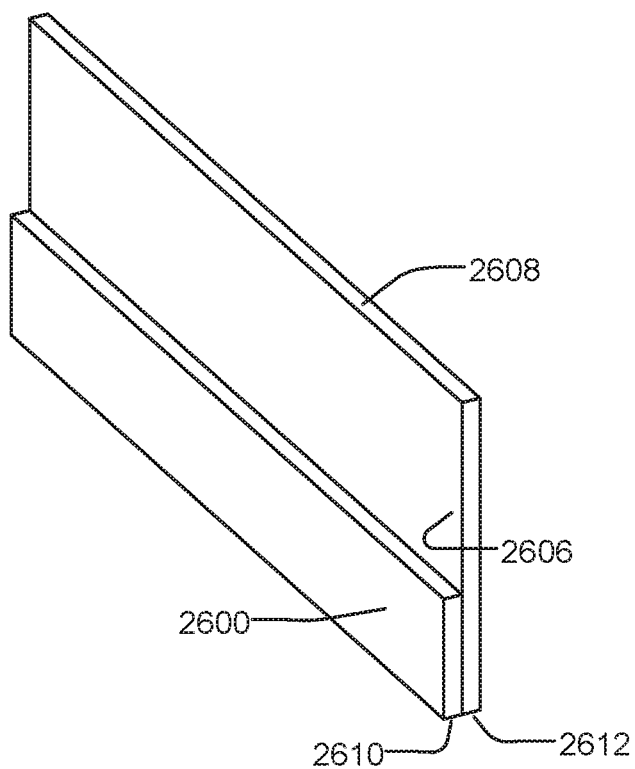

In other aspects of this disclosure, a layer of sound-dampening material may be coupled to a back side of a valance in other manners. For example, as illustrated in FIG. 26A, a layer of sound-dampening material 2600 may have an adhesive side 2602. A backing strip or liner 2604 may be removed from adhesive side 2602, as illustrated in FIG. 26A, and sound-dampening material 2600 may be coupled to a back side 2606 of a valance 2608, as illustrated in FIG. 26B. In the illustrated example of FIG. 26B, a bottom edge 2610 of sound-dampening material 2600 is substantially even or flush with a bottom edge 2612 of valance 2608. However, in other aspects of this disclosure, sound-dampening material 2600 may be placed higher on back side 2606 such that bottom edge 2610 of sound-dampening material 2600 is spaced apart from bottom edge 2612 of valance 2608. Additionally or alternatively, the width/height of sound-dampening material 2600 may be longer or shorter, depending on the desired coverage.

Figure 27:
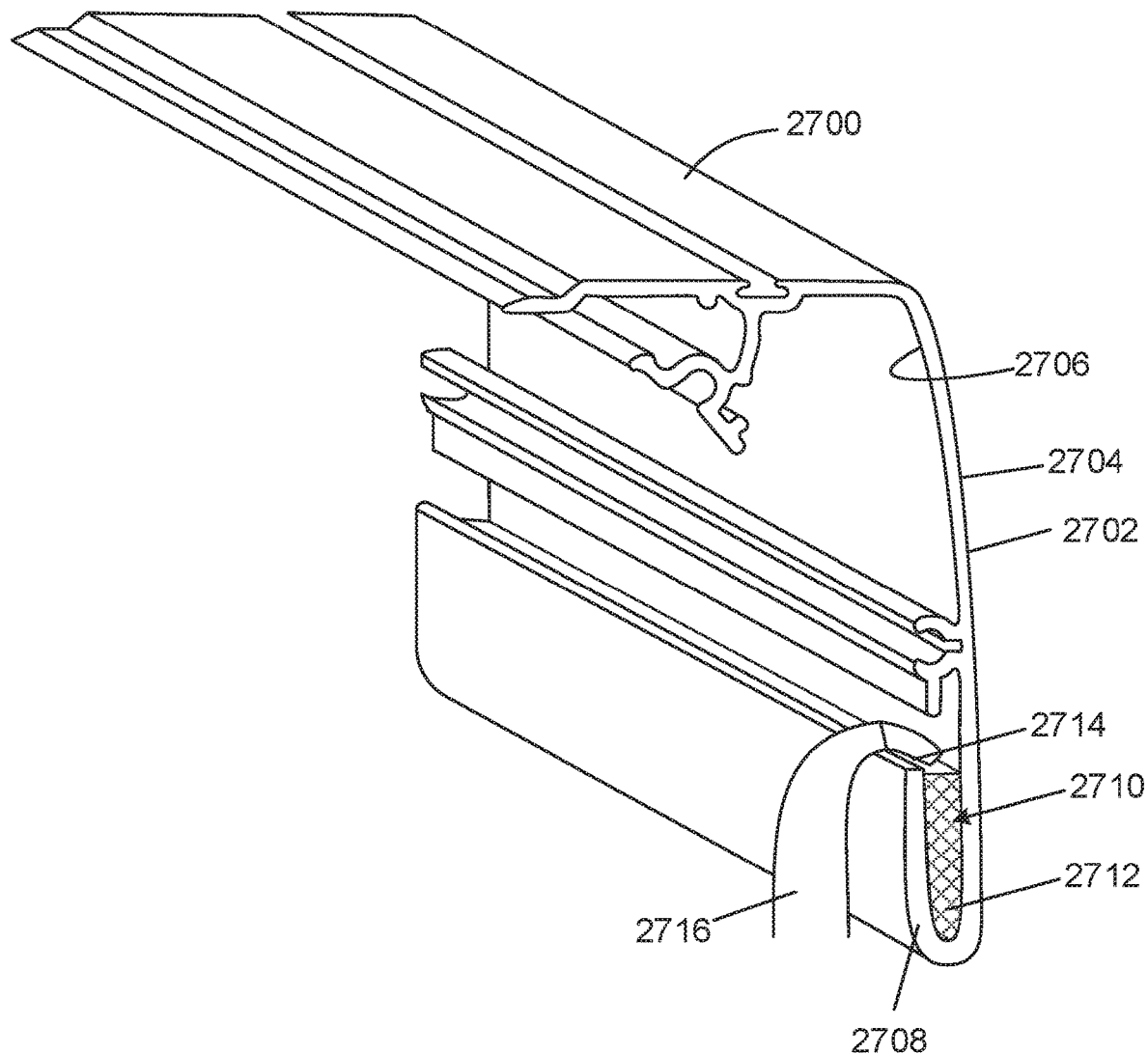
FIG. 27 illustrates an example of a valance having a pocket into which sound-dampening material may be disposed and constructed in accordance with one or more principles of this disclosure.

In another aspect of the disclosure, a valance may include a pocket or recess and sound-dampening material may be extruded into the pocket or recess, which holds the sound-dampening material. For example, as illustrated in FIG. 27, a headrail 2700 includes a valance 2702 having a front side 2704 and a back side 2706. Valance 2702 has a curved lip 2708 that forms a pocket 2710 along back side 2706. Sound-dampening material 2712 may be inserted into pocket 2710. In one aspect of the disclosure, sound-dampening material 2712 may be ejected into pocket 2710 from a slot die nozzle 2714. Sound-dampening material 2712 may be fed through a feed line 2716 and out of nozzle 2714 into pocket 2710. In one aspect of the disclosure, valance 2702 is constructed via an extrusion process, while nozzle 2714 simultaneously extrudes sound-dampening material 2712 into pocket 2710. Lip 2708 holds sound-dampening material in place and also protects the covering (e.g., fabric) from contacting sound-dampening material 2712, which may otherwise leave marks on the covering. In one aspect of the disclosure, sound-dampening material 2712 is butyl rubber.

The aspects of this disclose relating to the drive coupling may be used separate from or in combination with the aspects of this disclosure relating to the sound-dampening material on the valance. For example, while FIG. 24 illustrates example architectural covering 100 (having drive coupling 110 (FIG. 2)) used in combination with valance 2408 (having sound-dampening material 2502 (FIG. 25A)), example architectural covering 1600 (having drive coupling 1614 (FIG. 16) or drive coupling 2300 (FIG. 23A)) may instead be used in combination with valance 2408. Further, in other examples, any of these sound-reducing features may be used independently of each other. For example, drive coupling 110 may be used on any type of motorized or non-motorized architectural covering, which may or may not use a valance. Likewise, example valance 2408 may be used with other motorized or non-motorized architectural coverings that do not employ example drive coupling 110, drive coupling 1614, or drive coupling 2300. However, in some aspects of the disclosure, the combination of using vibration-absorbers in a drive coupling (e.g., drive coupling 110) and using a layer of sound-dampening material on a valance (e.g., valance 2408, valance 2608, or valance 2702) decreases audible noise by an amount that is greater than or equal to the sum of the noise reduction caused by each feature used by itself. Thus, in some instances, the use of these features together causes a significant reduction in audible noise.

From the foregoing, it will be appreciated that the above disclosed drive couplings and sound-dampening materials may be used to reduce potential sound or noise generated by an architectural covering. Additionally, example drive couplings disclosed herein utilize fewer parts than known coupling assemblies for transferring rotational motion from a motor to a roller tube. As such, example drive couplings are less expensive to manufacture and assemble than known coupling assemblies within architectural coverings.

What is claimed is:

1. An apparatus to reduce noise in a motor assembly, said apparatus comprising:
   a first driver configured to be coupled to and rotated by an output shaft of a motor, said first driver including a first set of posts;
   a second driver, said second driver including a second set of posts;
   a plurality of vibration-absorbers coupled to respective ones of said posts on said first and second drivers, each of said vibration-absorbers having a groove formed in an outer edge of said respective vibration-absorbers; and
   a hub disposed between said first driver and said second driver such that an edge of said hub extends into said grooves of said vibration-absorbers,
   wherein said second driver is configured to be coupled to a rotating member to transfer rotational motion from said first driver to the rotating member via said vibration-absorbers.

2. The apparatus of claim 1, wherein said vibration-absorbers include elastic rings.

3. The apparatus of claim 1, further including a rotating member in the form of a lift rod of an architectural covering, said lift rod rotates one or more spools to wind one or more lift cords, wherein said second driver is coupled to an end of said lift rod.

4. The apparatus of claim 1, wherein said first driver includes a mounting shaft having an output shaft opening to receive the output shaft of the motor, said output shaft opening having two contact locations configured to engage the output shaft of the motor, said two contact locations axially separated in said output shaft opening by a transverse opening extending through said mounting shaft in a direction that is perpendicular to said output shaft opening.

5. The apparatus of claim 1, wherein said first set of posts extend toward said second driver, and said second set of posts extend toward said first driver.

6. The apparatus of claim 5, wherein said vibration-absorbers are disposed between said first driver and said hub and between said hub and said second driver.

7. The apparatus of claim 6, wherein said edge of said hub is an outer peripheral edge of said hub, and wherein said hub includes a plurality of notches extending into said outer peripheral edge of said hub, said vibration-absorbers disposed in respective ones of said notches.

8. The apparatus of claim 1, wherein said posts extend through openings in respective ones of said vibration-absorbers such that distal ends of said posts are disposed beyond said respective ones of said vibration-absorbers.

9. The apparatus of claim 8, wherein said distal ends of said posts have nubs to retain said respective ones of said vibration-absorbers on said posts, said nubs having larger diameters than said openings in said vibration-absorbers.

10. An apparatus to reduce noise while operating an architectural covering, said apparatus comprising:
    a vibration-absorber having an opening, said vibration-absorber having a groove formed in an outer edge of said vibration-absorber;
    a driver configured to be coupled to and rotated by an output shaft of a motor in the architectural covering, said driver having a post extending through said opening such that a distal end of said post is disposed beyond said vibration-absorber, said distal end having a nub, said nub having a larger diameter than said opening to retain said vibration-absorber on said post;
    a driven member; and
    a hub disposed between said driver and said driven member such that an edge of said hub extends into said groove of said vibration absorber, said driven member operatively engaged with said vibration-absorber via said hub, said driven member configured to be coupled to a rotating member to transfer rotational motion from said driver to the rotating member via said vibration-absorber and said hub.

11. The apparatus of claim 10, wherein said driver includes a set of posts, and said vibration-absorber includes a set of vibration-absorbers, each of said vibration-absorbers coupled to a respective one of said posts.

12. The apparatus of claim 11, wherein said vibration-absorbers include elastic rings.

13. The apparatus of claim 10, further including:
   a valance to be disposed outside the rotating member; and
   a layer of sound-dampening material coupled to the valance.

14. The apparatus of claim 13, wherein the layer of sound-dampening material includes butyl rubber.

15. The apparatus of claim 10, wherein said vibration-absorber is a first vibration-absorber, said opening is a first opening, and said post is a first post, the apparatus further including a second vibration-absorber having a second opening, and wherein said driven member has a second post extending through said second opening of said second vibration-absorber, said second vibration-absorber engaged with said hub.

16. The apparatus of claim 15, wherein said first post extends toward said driven member, and said second post extends toward said driver.

17. A method of dampening vibration imparted from a driver to a driven member in an architectural covering, said method comprising:

positioning a first set of vibration-absorbers on a first set of posts of a first driver coupled to and rotated by an output shaft of a motor;
   positioning a second set of vibration-absorbers on a second set of posts of a second driver coupled to a driven member of an architectural covering, each of the vibration-absorbers having a groove formed in an outer edge of the respective vibration-absorbers; and
   positioning a hub between the first driver and the second driver such that an edge of the hub extends into the grooves of the vibration-absorbers, wherein the vibration-absorbers dampen the transmission of vibration between the output shaft and the driven member.

18. The method of claim 17, wherein the vibration-absorbers are elastic rings.

19. The method of claim 17, wherein the vibration-absorbers are constructed of nitrile rubber, the method including dampening vibrations of the output shaft by absorption through the vibration-absorbers.

20. The method of claim 17, wherein the edge of the hub is an outer peripheral edge of the hub, wherein the hub has a plurality of notches extending into the outer peripheral edge of the hub, and wherein positioning the hub between first driver and the second driver includes positioning the vibration-absorbers in respective ones of the notches.

* * * * *